US012626607B2

(12) United States Patent (10) Patent No.: US 12,626,607 B2

Chen et al. (45) Date of Patent: May 12, 2026

(54) INTERNET OF THINGS-BASED TRANSPORTATION SHUTTLE AND SHUTTLE TRAFFIC SYSTEM

(71) Applicants: Zhongrui Chen, Beijing (CN); Jingchao Chen, Qingdao (CN)

(72) Inventors: Zhongrui Chen, Beijing (CN); Jingchao Chen, Qingdao (CN)

( * ) Notice: Subject to any disclaimer, the term of this patent is extended or adjusted under 35 U.S.C. 154(b) by 143 days.

(21) Appl. No.: 18/575,441

(22) PCT Filed: Jul. 7, 2022

(86) PCT No.: PCT/CN2022/104478

§ 371 (c)(1),
(2) Date: Dec. 29, 2023

(87) PCT Pub. No.: WO2023/000995

PCT Pub. Date: Jan. 26, 2023

(65) Prior Publication Data

US 2024/0312354 A1 Sep. 19, 2024

(30) Foreign Application Priority Data

Jul. 23, 2021 (CN) .......................... 202110860506.X

(51) Int. Cl.
G08G 7/00 (2006.01)
G06Q 10/047 (2023.01)
G16Y 40/30 (2020.01)

(52) U.S. Cl.
CPC ............. G08G 7/00 (2013.01); G06Q 10/047 (2013.01); G16Y 40/30 (2020.01)

(58) Field of Classification Search
CPC ......... G08G 7/00; G16Y 40/30; G06Q 10/047
See application file for complete search history.

(56) References Cited

U.S. PATENT DOCUMENTS

| | | | |
|---|---|---|---|
| 5,146,853 | A | 9/1992 | Suppes |
| 2013/0025493 | A1 | 1/2013 | Friedmann |
| 2023/0234450 | A1 | 7/2023 | Cai |

FOREIGN PATENT DOCUMENTS

| | | |
|---|---|---|
| CN | 106522050 A | 3/2017 |
| CN | 107839696 A | 3/2018 |

(Continued)

OTHER PUBLICATIONS

CN112046550A English translation (Year: 2020).*

*Primary Examiner* — James J Lee
*Assistant Examiner* — Brandon S Lee

(57) ABSTRACT

The present invention defines and constructs internet of things-based green traffic system for civil-military integration (GTS), which relates to the fields of intelligent transportation, intelligent cabin, Internet of Things, Internet, communication network, big data, driverless, joint control, magnetic levitation, magnetic drive, auto-payment, sensing, positioning, identification, national defense security, social security, and so on. Adoption of risk segregation, joint control, de-consolidation transport, de-signalization, de-signing, full intersection interchanges, station/stop insertion, intelligent control, fully enclosed all-weather all-day operation, unlimited speed, unmanned, one-stop arrival, online parking, general use by military, police and civilians, disposal of passenger and cargo priority franchise, intelligent control linkage to the system of intelligent cabin real-time monitoring and automatic control and optimization of the line, resource utilization and system balance, and other programs to ensure that the system safety and efficiency, optimal operation, to solve peak bottlenecks, low capacity, accidents, affected by the weather, waste of resources and other traffic problems, to create a very simplified standardization, resource sharing, global access to green transport green travel.

8 Claims, 2 Drawing Sheets

(56)          References Cited

FOREIGN PATENT DOCUMENTS

| CN | 109204007 | A | | 1/2019 | | |
|----|-----------|---|---|--------|---|---|
| CN | 110014847 | A | | 7/2019 | | |
| CN | 112046550 | A | * | 12/2020 | .......... | B61L 15/0081 |
| CN | 202110860506.X | | | 7/2021 | | |
| WO | 2019165451 | A1 | | 8/2019 | | |
| WO | WO-2021133995 | A2 | * | 7/2021 | | |

* cited by examiner

INTERNET OF THINGS-BASED TRANSPORTATION SHUTTLE AND SHUTTLE TRAFFIC SYSTEM

FIELD OF THE INVENTION

The invention herein relates to a transportation vehicle and a traffic system, and in particular relates to a Shuttle and a Shuttle Traffic System that are based on the Internet of Things (IoT).

BACKGROUND OF THE INVENTION

Current Mainstream Technologies:

1. Current traffic systems (all traffic systems mentioned herein refer to land traffic systems, abbreviated as TS) consist of two main types (collectively abbreviated as 2TS): TTS (Traditional Traffic System) and ITS (Intelligent Traffic System).

2. 2TS Framework Setting: The macro-framework mode of 2TS and the vehicles it covers is the Operation and Control Intersecting (OCI) mode, i.e., high-speed and high-risk transportation vehicles, the traffic police, traffic signs, facilities, etc., which control traffic safety and order, and other vehicles, drivers, pedestrians, weather, and even small animals, etc., are all on the open, open road, and their trajectories cross and influence each other.

3. 2TS constituent elements: The 2TS constituent elements are: people, vehicles, roads and environment in four major areas. The strongly related subdivision factors include: road network, vehicles, drivers, passengers, pedestrians, traffic police, signals, traffic signs, monitoring facilities, safety protection, public places (only the densely populated areas related to transportation. For example, transportation hubs, train stations, subway stations, bus terminals, some bus stops, etc.), vehicle management, driver training, supporting services, traffic regulations, etc.

4. ITS and TTS development: ITS and TTS have obvious homogeneity. Under the premise that the traditional road network form, basic structure of vehicles and transport mode remain unchanged, ITS only simply and partially embeds intelligent functions and facilities into vehicles and roads in terms of convenience, such as electronic payment, traffic information application, GPS positioning, partial data collection, etc. Parking and driving are still performed manually, and still every family has a car and travel by car. ITS and TTS do not take into account the important aspects that lead to traffic bottlenecks (number of travelers, vehicle ownership, traffic load, etc.), and not only fails to solve, but also increasingly aggravate traffic problems such as traffic congestion and derived problems.

Four Major Global Traffic Problems:

1. Severe congestion and increasing overall traffic pressure during peak hours.

2. Many traffic accidents and huge loss of life and property.

3. Low system efficiency and high time cost and high empty rate (Note: Empty rate means the proportion of empty seats or empty loads to the load when the vehicle is in operation).

4. Serious environmental pollution, serious waste of resources and insufficient resources.

Characteristics and Problems of Current Mainstream Technologies (the Further Specified Problems from this Section are the Specific Technical Problems to be Solved By the Invention Herein, and are Expressed in the "the Specific Technical Problems to be Solved" Section of the "Object and Summary of the Invention".):

1. The Characteristics and problems of transport mode and transport process: transport mode is consolidation (Hub-and-Spoke), and the transport process is relay-based. Consolidation manifests itself in both centralized terminus and vehicle large-scale, while stations/stops are designed to match the form and layout of consolidation. relay-based performance: (bulk passenger or bulk cargo) each from the starting point—gathered to the originating terminus—departing by vehicle (most of them allow temporary boarding or alighting en route)—arrive End terminal—transfer intermodal diversion (may be multiple times)—to their respective end points, and mostly regular departures and fixed routes (Note: Route, line, and path are used synonymously in this application, i.e., a combination of different lanes and/or sections of roadway). It is not the true meaning of Unistop. Note: Unistop (as used in this invention) is a generic term for transport operations that drive directly from origin to destination. It specifically includes one or more of the following direct modes: non-stop (NS), point-to-point (PP), and non-stop point-to-point (NSPP). Whether intermediate stops occur depends on the chosen direct mode: non-stop makes no intermediate stops; point-to-point may make intermediate stops without requiring transfers; non-stop point-to-point drives between two points with zero intermediate stops. For non-stop and non-stop point-to-point, exceptional temporary stopping is permitted in cases of emergencies, safety handling, customer needs, or dispatcher-directed yielding.

Note 1: In the invention herein, Unistop includes two meanings of transport mode (referring to the technical solution) and/or transportation effect (referring to the effect of the solution). The exact meaning depends on the context before and after. Note 2: One-Stop Direct that people often talk about and Unistop used in the invention herein are completely different in their ways and effects: In the former case, all passengers get on and depart collectively from a terminus, arrive directly at next terminus and get off collectively, but the pick-up and drop-off stations/stops are usually not the origin and destination of the passengers, and most of them still need to make multiple transfers. The latter is that individual passengers get on the Shuttle from any nearest stop, and directly arrive at another stop and get off, the drop-off point is the passenger's destination, and there is no need to transfer between the origin and the destination. The latter is the real meaning of Unistop.

2. Characteristics and problems of control: For vehicles and pedestrians driving freely on the open road without separation, the measures used, such as signals, signs, traffic police, regulations, capture, speed limit, etc., present the characteristics of weak order, weak right of way, weak monitoring, weak predetermination, human control, no error prevention, and many causes of accidents. no advance sensing, no collection and analysis, no pre-correction; no follow-up correction.

3. Characteristics and problems of the road network: the road surface is open, unsealed, less separated, and Vehicle Exposure; the road condition is Pedestrian-Vehicle Mixed-Traffic, and Crossed-Trajectories, with many influencing factors and many combinations of accident causal chains and changes at any time; the road network has many intersections, few interchanges, and different complexities and qualities. This is the key link in the accident causal chains.

4. Characteristics and problems of vehicles: many models, large size, complex structure, many component systems;

performance, condition, speed and load capacity vary greatly; mostly wheel systems and fuel driving, driver-driven; very few vehicles are designed to connect seamlessly to a specific area. Note: "Seamless interconnection" means extending the pipe network by modular splicing to designated areas and configuring stops there, so as to achieve point-to-point through service between areas. Also see "12. Seamless Interconnection."

Note: Specific Areas including medical areas, emergency areas, or other public-service areas; for example, are, airports, terminals, railway stations, bus terminals and other air, land and sea hubs and stations, subway stations, large shopping malls, CBD, large scenic areas, important attractions or amusement parks, parks, large residential areas and all other densely populated areas; vehicle manufacturing, management, maintenance, cleaning, traffic system operations and maintenance, other related areas; hospitals, schools and kindergartens, government, military sites, police sites and other important areas; Smaller spaces such as buildings, homes or wards; other areas that need to be connected.

5. Characteristics and problems of driver: At least one licensed driver with manual driving risk per vehicle.

Note: Manual Driving Risks, including but not limited to: Fatigue driving, drunk driving, road rage, red light running and other kinds of violations, and drivers vary greatly in all aspects of their individuality, the lack of operational accuracy and persistence, easy to misuse in new road conditions or sections, more difficult to handle in advance, etc.

6. Characteristics and problems of pedestrians: Sharing the right-of-way with vehicles, Crossed-Trajectories of pedestrian and vehicles.

7. Characteristics and problems of traffic police: Traffic police are provided for on-site control of vehicles and traffic.

8. Characteristics and problems of signs: Various signs and signals are installed on the roadway, in the air, and on both sides of the roadway.

9. Characteristics and problems of monitoring facilities: The focus is on recording driver and vehicle violation facts in a discontinuous distribution. No comprehensive analysis, proactive prediction, early correction or error prevention features, no feature that provides front-loaded, safe and reliable real-time ("Real-time" is used herein as an abbreviation for "quasi-real-time"; same hereinafter. "Terms and Symbols") information to the driver.

10. Characteristics and problems of safety protection: Partial separation of reverse traffic flow; few separation measures between pedestrian and vehicles and between vehicles in the same direction; no technology to separate weather from roads and vehicles.

11. Characteristics and problems of public places: Setting up many public places and large gatherings of passengers.

12. Characteristics and problems of Parking Spaces: Each vehicle needs to be allocated 2 fixed parking spaces (residential and work sites), and a certain amount of public parking spaces.

13. Characteristics and problems of energy and environmental protection: Fuel is the energy source for most vehicles and has low energy efficiency.

14. Characteristics and problems of mutual interference: There is mutual interference and intensification between the above-mentioned items.

OBJECT AND SUMMARY OF THE INVENTION

Object of the Invention

Based on the IoT+Internet+Communication Network+Big Data (or IICB), invent an IoT-based Transportation Shuttle and Shuttle Traffic System to solve the urgent traffic problems faced by the global transportation, get rid of the traffic dilemma completely, and construct a future, green and sustainable transport system.

Note 1: Transportation Shuttle, which is a kind of transportation vehicle that is based on IoT, lightweight miniature streamlined form levitation state, all-weather full-automated driverless within a pipeline network, Online Driving and Online Parking, high-speed, Unistop, referred to as Shuttle. The Shuttle takes the shuttle shape as an example, but is not limited to the shuttle shape, and is used the term Shuttle System when expressing the overall composition of the Shuttle. It removes the vast majority of the composition and characteristics of existing cars or trains, and is a brand-new type of transportation machine, the detailed composition and characteristics of which, where are vastly different from those of existing vehicles are described in detail below. Note 2: Shuttle Traffic System, which is a kind of new business format for a traffic system, in which Shuttles seamlessly connect to a Specific Area by being integrated as a single system with the pipeline network and other constituent elements of the traffic system, dynamically optimizing routes by Joint Intelligent Control of transportation, emergency response and services, and Online Driving and Online Parking, all weather automatic high-speed and efficient, Unistop. Referred to as Shuttle Traffic or STS. It rejects many of the constituent elements of the existing vehicles and the 2TS as well as the peripheral facilities and functions, and greatly simplifies the 2TS and its detailed composition and features. It greatly simplifies the 2TS and peripheral facilities, and its detailed composition and characteristics are different from those of 2TS, as described below. Note 3: Pipe network, streamlined profile, and high-speed-see "Terms and Symbols".

THE SPECIFIC TECHNICAL PROBLEMS TO BE SOLVED

1. Lack of effective technical means to increase transportation capacity, in particular, there is a lack of technical means to eliminate peak traffic bottlenecks. This is the first comprehensive problem to be solved, and it is a problem that can be solved by solving the following problem.

2. Transport mode of consolidation and the many problems arising from it.

3. The driving route is fixed and speed is limited.

4. Public transportation detours, intermittent timed departures, in and out of en-route stops, and transfers.

5. Manual Driving.

6. Manual control of traffic and no error-proof.

7. Public places are laid out for the purpose of collecting and transferring transportation.

8. Inconsistent standards, inconsistent quality for the road network and vehicles.

9. Fuel or electric forms of energy and accompanying fuel or batteries, numerous and heavy components, and mechanical driving methods.

10. Failure to separate weather from vehicles and roads.

11. Speed limits, limits that are too low, limits that are variable.

12. Vehicle Exposure, Pedestrian-Vehicle Mixed-Traffic, and right-of-way conflicts.

13. Signs, Signal lights and signal switching.

14. Drop-off and pick-up patterns at way stations.

15. Relay-based transportation with multiple transfers is used, and there is no technical means of direct transportation from one stop.

16. Too many components of conventional vehicles and 2TS, and too many causes of traffic accidents, they are weakly controlled, or even uncontrolled.

17. Without error-proofing.

18. Vehicles are designed to be of multiple types and models, large or in trains, multiple people in one vehicle or centralized, driver-driven, with no information transfer channels to each other, and designed for low speeds. (Note: The invention herein relates to solving this problem without involving specialty vehicles and truckload trucks).

19. 2TS monitoring and control lacks data, predictability, antecedence, immediacy and effectiveness. That is, lack of data collection, analysis and prejudge in advance for pedestrian flow, road conditions, vehicle conditions and road network, Lack of measures for proactive prevention, diversion and error-proofing to prevent traffic congestion, and inability to provide safe and fast optimization solutions for each vehicle trip.

20. Lack of guaranteed means of Priority/Concession (or P/C, see "19. Transport P/C").

21. Configure offline parking spaces.

22. Excessive weight of single vehicle, many seats or large load, complex structure, mostly on wheels to move on the highway or railroad tracks.

23. Failure to establish seamless linkages with specific regions, and failure to form intelligent joints with linking up cross industries.

24. Lack of technical means to reduce the serious waste of time resources, natural resources, and social resources. New Feature Technology to be Add:

1. P/C

2. Lock and force the transfer.

3. Data acquisition and travel recommendation.

4. Dedicated vehicle sharing.

5. Online Driving and Online Parking.

6. Automatic emergency response to fire and automatic sprinkler.

7. Unobstructed emergency rescue.

8. Error-proof.

9. Passenger status monitoring.

10. Road condition judgment.

11. Passenger health monitoring.

12. Billing charges for ticket-free cloud payment.

DETAILED DESCRIPTION OF THE INVENTION'S TECHNICAL SOLUTIONS

Technical Solutions for the Above-Mentioned Object of the Invention, the Specific Technical Problems to be Solved and The New Functional Technology to be Add 1. Operation-Control Separation (OCS): the part that performs control/operation is not co-located with the entity that passively executes transport; they are physically isolated by the pipeline network. Accordingly, the shuttle does not possess independent operating capability and is controlled by Intelligent Control System (ICS) external to the shuttle. It overturns the 2TS model, and reconstructs the STS compositional framework mode into "1+3" transport mode of OCS, i.e., 1 transport body+3 intelligent control linkages, two major parts. The "1 transport body" refers to Shuttleway System; in which the Pipeline System forms a road network through Separation Pipeline, the road network is fully-enclosed or semi-enclosed (Note: As used herein, "enclosed" refers to fully-enclosed or semi-enclosed configurations unless otherwise specified.), full interchange; in which the Shuttle is MLMD (Note: As used herein, MLMD is abbreviated for Magnetic Levitation and Magnetic Driving. See "16. MLMD.") and a driverless carrier; and in which Shuttleway System is the key breakthrough of the entire STS framework, making it possible to break the peak bottleneck and traffic pressure. The "3 intelligent control linkages" are Control-Safeguard System, Data System, and Emergency System, which ensure the safe, efficient, and optimal operation of the transport body. And the overall STS operation is all non-manual mode. It forms an enclosed, all day, all-weather, unlimited speed, intelligent control, driverless, Unistop traffic mode. This technical solution provides direction for the proposed entry points of the following technical solutions and guarantees the feasibility of technical solution implementation.

2. Systems Complementary: STS and 2TS co-exist, with STS mainly carrying passengers and divisible small cargo, and 2TS wheel system mainly carrying large cargo, complementing each other.

3. The technical solutions 1, 2 and the following technical solutions are combined to solve the technical problem No. 1. At the same time, to solve or/and synergistically solve the following corresponding problem or/and added function of each article independently (Note: Synergistically solved means that different technical solutions are combined to solve the same numbered technical problem or/and added function).

4. Separation Pipeline: From the perspective of safety and speed, the system is separated from the static and dynamic, i.e., in all the transportation lines, the enclosed pipeline system is used as a protective shield, which completely separates the high-risk moving shuttles from the external elements, such as pedestrians, other vehicles, and weather effects, and greatly reduces the causes of accidents, and completely blocks the causal chain of the important accident factor of high-speed moving Shuttle and the risks it brings. And by full interchange, de-signal lights and de-signposted, it provides space for the Shuttle to operate at high speed in the enclosed pipeline all day and all-weather (Note: "All-weather" means that the in-pipe network environment is unaffected, or only minimally affected, by external weather conditions such that the shuttle can operate normally.) without obstacles, online parking, and other hardware deployment. The Pipeline and Shuttles together constitute a complete Shuttleway System, forming a Hard Body of protection and transportation, which is the transport body and framework core of STS, not only to separate the risk, reduced operating space and lane widths and heights, but also to improve the speed of the vehicle, but also to provide parking spaces and hardware spaces, STS elements are also reduced to Pipe Network System, Shuttle, passenger and cargo, wired and wireless channel, Intelligent Control System, and there is no movement Crossed-Trajectories between the elements. Solve the technical problems No. 1, 8, 10, 11, 12, 13, 16, 17, 21, 24 and the new features No. 5, 8. Note: The pipe network-isolated operating space, no physical separation facilities, traffic control devices, signs, or pavement markings are provided; driving, parking, emergency handling and other dispatch/control functions, as well as the generation of operating parameters, are performed automatically by Intelligent Control System based on monitoring data.

5. Lightweight Miniature Streamlined Shuttle: The Shuttle is different from conventional vehicles; it is a lightweight miniature streamline form transport equipment with standard modules (see "Terms and Symbols."). It removes most of the functional systems from conventional vehicles (such as steering and handling, engine/motor and starter, transmission, driving, braking, suspension, wheels and spare tire, fuel tank, cooling, exhaust, exterior lights, a variety of mechanical linkage, engine compartment and trunk, etc.), weight and volume compared to conventional cars are reduced by about 80% (see "Embodiment 10."); it consists of Shuttle Body System, MLMD, Backup Drive System, Shuttle Positioning System, Air Conditioning System, Lighting System, Audio-visual Interactive System, In-Shuttle Sensing System, Shuttle Safety System, Identification System, In-Shuttle Communication System, Shuttle Intelligent Control System, Wiring Harness System, Seating System; Shuttle belongs to the total invention idea STS inseparable part, and is the sole transport unit (the STS may optionally include support facilities, modules, or mechanisms for operation/maintenance, rescue, or services, which are not used for passenger or cargo transport; "Service System 24 -Sub-subsystems: composition, spatial relations, and functional realization"), Shuttle is controlled by the STS Intelligent Control System (see "5. Table 1-Constituent Subsystems of the STS and Functional Realization" under "Intelligent Control System", and other occurrences of "Intelligent Control System") and is classified into Passenger Shuttle and Cargo Shuttle; Passenger Shuttle with a load of no more than 4 persons and an optimized load (preferred capacity) (see "Terms and Symbols.") of 1+1 persons or limited cargo (i.e., quasi-single person ride: 1 main passenger, seated or reclined, with 1 rear seat for another person or luggage), with the possibility of exclusive rides alone and voluntary carpooling to minimize empty loads, and it also makes it easier to take care of the elderly, the children, the sick, the disabled and the pregnant, or for others to ride with them, saving resources, increasing capacity and lowering fares; Cargo Shuttle can be used for quick loading or unloading of bulk cargo in miniature containers with limited cargo loads; Shuttle can enter Specific Areas, especially small space areas, Shuttle can be coupled end-to-end (actual zero inter-shuttle spacing (ISS)), can employ MLMD and MB, and can operate driver-less. Due to the changes in road conditions, Shuttle's driving route and speed, ISS, parking spaces will be adjusted in real-time and changed dynamically, these adjustments and changes are based on the principles of shortest time duration, no stopping en route and optimal system resources, and judged and commanded by Intelligent Control System; Shuttle is the transport body and framework core of STS. Solve the technical problems No. 1, 2, 3, 4, 5, 7, 8, 9, 14, 16, 18, 21, 22, 23, 24 and the new functions No. 1, 2, 3, 4, 5, 9, 11, 12. Note: "inter-shuttle spacing (ISS)" refers to the longitudinal distance between adjacent shuttles in the direction of travel and is constrained by a minimum safe ISS threshold; the threshold is set according to the operating environment and needs and, to accommodate end-to-end coupling, may be set to zero. At zero ISS, the leading and trailing shuttles are connected head-to-tail by controllable locking and unlocking, and they remain under closed-loop control by Intelligent Control System based on sensor data, braking capability, and safety policies, with coordinated yielding ("yielding" means channel yielding/non-fixed emergency corridor; see "Terms and Symbols") to ensure safe and stable operation.

6. Unistop: Eliminating restrictions on the operation of intra-city and inter-city vehicles and transfer transport mode, and allowing Shuttles to drive, stop, and park anywhere on the road network. This plays the role of shunting and reducing the number of staff at congested stations/stops, cutting peaks and filling valleys, and eliminating the additional passenger flow gathered by transferring at transit stations, so that any person can take a Shuttle to depart from any stop at any time, eliminating the need for waiting, stopping, accompanying and transferring, etc., and reaching the destination at the drop-off point. Solve the technical problems No. 1, 2, 3, 4, 7, 10, 14, 15, 16, 20, 23, 24 and the new features No. 1, 2, 3, 4.

7. Joint Intelligent Control: Using the information and communication network based on IICB, it links STS components such as energy, Pipeline, Shuttle, passengers, central control and peripheral services together to form a Joint Intelligent Control System, i.e., Soft Combination of control and service. Among them, Central Control System communicates instantly with each part of the system, sends commands to each element and obtains the feedback information from each element, and then regulates and controls the IoT terminals in the whole system automatically, and jointly to ensure that all the components of STS operate in concert; moreover, Intelligent Control System makes judgment based on the principle that the Shuttle driving route and speed take the shortest time duration, no stopping en route and system resources are optimal, in order to optimize the utilization rate and balance of no stopping en route, speed, and traffic system related resources in real time, and to provide commands for the Shuttle, so that the operation status and vehicle condition of each Shuttle are the comprehensive result of the interaction between the Shuttle and the operation status and system status of a certain range of Shuttles, and are also the basis for Intelligent Control System to issue the operation commands, so that the Shuttles are in a real-time interactive response mode with the other elements of STS. Solve the technical problems No. 1, 3, 4, 5, 6, 13, 16, 17, 18, 19, 20, 21, 24 and the new features No. 1, 2, 3, 4, 5, 6, 7, 8, 9, 10, 11, 12.

8. Driverless: operates in a non-autonomous driving mode that replaces manual or autonomous driving; through the IoT sensing, communication technology, intelligent traffic regulation and control, fully automatic intelligent control, driving the Shuttle's real-time response to this Shuttle and other Shuttles conditions triggered by a variety of operating commands, to achieve Shuttle driverless, moving, stopping, parking and emergency response, and can make the baggage Shuttle or/and the companion Passenger Shuttle accompany and arrive simultaneously. Solve the technical problems No. 1, 5, 11, 13, 16, 17, 18, 20, 22, 24 and the new features No. 2, 7, 8, 12.

9. De-consolidation Transport: By eliminating centralized terminus, eliminating the transport mode of consolidation, and combining shuttle and Unistop technical solutions, eliminate passenger-dense public spaces, cut the causal chain of public health and public safety incidents, resulting in zero accidents and increased privacy. Solve the technical problems No. 1, 2, 4, 7, 14, 15, 16, 18, 24.

10. System-wide Intelligent Monitoring: Using shuttle monitoring, road network monitoring, road condition diagnosis and other measures to carry out real-time monitoring, analysis, pre-judgement of road and vehicle conditions, real-time response, optimization of routes, automatic scheduling, automatic billing and charging and other operations, optimizing and temporarily responding to Shuttle routes in advance ("optimizing and temporarily responding to Shuttle routes in advance" means "preferred dynamic route (PDR)"; see "Terms and Symbols"), and implementing multiple error-proofing measures. Solve the technical problems No. 1, 6, 13, 16, 17, 19, 20, 21, 24 and the new functions No. 8, 10.

11. Standard Modules: Modularizing standard modules such as Pipeline, Shuttle, interchanges, maintenance, etc., and easily splicing these modules to connect road sections, areas, cities, intercity, countries and regions without boundaries. Solve the technical problems No. 1, 8, 16, 18, 24.

12. Seamless Connection: Inserting the road network and stops in a Specific Area or any area where they can be inserted to implement a multi-industry integration of shuttles, transportation, and services, and to form an all-in-one service, without the need to be first transported to the merchant's warehouse, sold, licensed, transferred, etc., the Shuttles will be online as soon as they leave the factory, and the passengers can take the Shuttle nearby. Solve the technical problems No. 1, 2, 3, 4, 7, 10, 14, 15, 16, 23, 24 and the new function No. 1, 2, 4.

13. Unlimited Speed: Under the premise of safety and design permission, Intelligent Control System according to the road condition automatically adjusts the speed without speed limit, automatically selects the high speed first and as fast as possible to minimize the time in transit. Solve the technical problems No. 1, 3, 4, 6, 11, 16, 18, 20, 24 and the new function No. 1.

14. Online Driving and Online Parking: Online driving when busy and online parking when idle, realizing that the Shuttle is not offline, instantly responding to switching the driving and parking status, maximizing the use of pipeline space, and eliminating ground parking spaces. Solve the technical problems No. 1, 4, 10, 12, 16, 21, 24 and the new function No. 5.

15. Electric Energy: Distribution of power stations and laying of lines along the pipeline to provide electric energy for STS and its continuous cleanliness. Solve the technical problems No. 9, 24.

16. MLMD: The magnetic poles are installed on the shuttle and within the pipe network respectively, which cooperate with each other to realize Magnetic Levitation (ML), Magnetic Driving (MD), and Magnetic Braking (MB). The Magnetic Driving refers to electromagnetic propulsion, such as linear synchronous or induction motors, distinct from Maglev Lift and Magnetic Braking (MB). Collectively, these functions provide controllable and reliable lift, propulsion, and braking performance. Solve the technical problems No. 1, 9, 11, 16, 22, 24.

17. Reduction of Accident Causal Chains: By changing the component elements of the vehicle and traffic system, and by using reorganization of elements of enclosed Pipeline, Shuttle separation, quasi-single person ride, driverless, de-visualized signal, hidden danger warning, intelligent IoT, Joint Intelligent Control, etc., to minimize the causes of accidents and break the accident causal chains. Solve the technical problems No. 1, 5, 6, 7, 8, 9, 10, 11, 12, 13, 14, 16, 17, 18, 22, 24.

18. Health Monitoring and Health Emergency: The Shuttle is equipped with health monitoring devices and health emergency help functions to automatically monitor passenger health signs (e.g., respiration, pulse, blood pressure, and body temperature) in transit, and when passengers are found to have abnormal health, immediately open the emergency channel to accelerate direct access to the appropriate hospital, and synchronize the notification of the hospital emergency center and the passenger's guardian, and forcibly connect the guardian's phone in emergency case, also in the case of non-emergency medical treatment, passengers can choose the priority of medical treatment. Solve the technical problem No. 20 and the new feature No. 1, 2, 6, 7, 9, 11, 24.

19. Transport P/C: Granting different P/C levels to persons with special needs, such as military personnel, police officers, medical personnel, patients, students, public officials, etc., to ensure that they travel first and are transported quickly. Solve the technical problems No. 20, 24 and the new feature No. 1. Note: Transport P/C is one kind of priority policy. The priority policy includes at least: emergency-task priority and task priority based on different P/C levels, so as to ensure reasonable dispatching and system efficiency under concurrent tasks or resource conflicts.

20. Special Control System: Using special measures such as remote automatic locking and tracking, locking of doors, forced change of destination, etc., to control and deliver specific persons when necessary. Solve the technical problem No. 24 and the new functions No. 2, 9.

21. Big Data: Automatically complete the identification, collection, statistics and analysis of data such as identification, trace search, driving data, Shuttle distribution, personnel distribution, Shuttle utilization, STS status, passenger status and habits, etc., and push convenient services such as driving density and other information, best driving time suggestions and ride reservations for travelers in real time and optimize STS. Solve the technical problem No. 1, 6, 15, 19, 20, 24 and the new function No. 1, 2, 3, 5, 8, 9, 10, 11, 12.

22. Exclusive Delivery and Sharing: Replace the vast majority of vehicles carrying people and cargos with Shuttles, share them for private rides or shipments, dedicated delivery direct, so that passengers are not affected by others and choose independently in terms of driving time, routes, moving and parking, habits, sightseeing, entertainment, sitting and sleeping, rest, health, privacy, independent carpooling, etc., and reduce the disadvantages of carpooling stagnation, large distribution and delivery, difficulty in direct access or too high cost of direct access. Solve the technical problem No. 1, 2, 4, 14, 15, 18, 20, 24 and the new feature No. 4.

23. Automatic Fire Recognition and Response: locking the location of the fire, clearing the nearby Shuttles, activating the automatic sprinklers in the pipeline, instantly targeting the fire, activating the fire alarms and other fire contingency plans, and equipping the pipeline and Shuttles with fire-fighting equipment. Solve the technical problem No. 1, 6, 24 and the new function No. 6, 10.

24. Non-fixed Emergency Channel: In case of emergency, a section of lane or/and a route will be cleared automatically and be generated in real time as an emergency lane, realizing unobstructed super-high-speed (see "Terms and Symbols: v_ultra") access. Solve the technical problem No. 1, 6, 20, 24 and the new function No. 1, 7. Note: An emergency channel is the PDR for which other shuttles must yield. By purpose, it includes fire channels and ambulance channels. The emergency channel is non-fixed and is immediately restored to other uses once the emergency ends.

25. Error-proofing: Using various Error-proofing measures such as Separation Pipeline, Shuttle collision avoidance, etc. Solve the technical problem No. 1, 10, 12, 16, 17, 24 and the new function No. 8.

26. Warning Alerts: Real-time monitoring of whether the passenger's seat belt is buckled before and during the movement of the shuttle, prohibiting the opening of the seat belt at medium and high speeds, or voice reminder or warning when it is opened, or even remotely intervening to force the shuttle to stop in the vicinity. Solve the new function No. 9.

27. Pre-judgment of Unobstructed Path: The monitoring system automatically determines the road conditions and provides driving commands for the Shuttle that is about to drive through. Solve the technical problem No. 1, 3, 6, 24 and the new function No. 7, 10.

28. Cloud Payment (an imperceptible settlement mechanism executed automatically by the STS): No ticket or card purchase and payment process, automatic billing and settlement. Solve the technical problem No. 1, 6, 24 and the new function No. 12.

29. At the same time of using the above technical solutions, along with the elimination of traffic police duty, driver training, vehicle inspection and control, toll facilities, repair stores, gas stations, car wash and decoration services, parking lots and many other related services, greatly saving resources and reducing pollution. Solve the technical problems No. 1, 9, 24.

BENEFICIAL EFFECTS

Beneficial Effects at the Level of Solving
Conventional Technical Problems

1. In terms of traffic pressure capacity: The problem of insufficient capacity and difficulty in riding in the morning and evening peaks (accounting for about 80% of the whole day's passenger traffic) is effectively solved, and the peak bottleneck is cracked to achieve high traffic volume and super high-speed transportation of passengers and cargos. In addition to special vehicles and bulky (beyond the Shuttle loading size or weight) trucks, the Shuttle can replace the vast majority of conventional vehicles, significantly reducing the type of vehicles, the number and comprehensive resource consumption, eliminating the current problem of too many vehicles and excessive traffic pressure.

2. In terms of problem-solving aspect: Almost all the problems related to 2TS and vehicles are solved. For example, waiting for scheduled departures, crowded rides, traffic congestion, Pedestrian-Vehicle Mixed-Traffic, accident-prone, signal waiting, Manual Driving Risks, parking difficulties, weather effects, long in-transit time, en route transfers, ineffective accompanying rides, and high energy consumption, high pollution, high cost, low capacity, public health and public safety hazards, many vehicles, and resource waste, etc. The vicious circle of conventional vehicles and 2TS is eliminated from the macro and root causes.

3. Achieved "3+N" (i.e., 3 full, N zero): All day, all weathers, fully automatic, zero signals, zero signs, zero labor, zero drivers, zero accidents, zero fatalities, zero traffic police, zero traffic control, zero queues, zero waiting, zero terminals, zero tickets, zero paying action, zero congestion, zero stops, zero transfers, zero escorts, zero invalid time, zero violations, zero parking spaces, zero vehicles purchases, zero garages, zero training, zero interference, zero pollution, zero emissions, zero waste. (Zero here means true zero or approach zero).

4. In terms of efficiency: Compared with passenger vehicles, the Shuttle's speed is 2-10 times higher, transportation capacity is 2-10 times higher, and driving time is saved by about 80%.

5. In terms of Shuttle manufacturing and road construction: Because the Shuttle is much simpler than the conventional vehicle structure, so the manufacturing process will be greatly reduced, energy consumption is greatly reduced, the amount of raw materials is reduced, the process is more simplified, processing is easier, and efficiency is greatly improved, the cost of the Shuttle is reduced by about 80%; At the same time, because the Shuttle is miniature and lightweight, and magnetic levitation surface is large, the pressure of the Shuttle on a unit area of guideway is much less than the pressure of a four-wheeled car on a road, so the construction and maintenance costs of Pipe Network System will be significantly reduced, the cost of pipeline is reduced by about 80%, the construction cycle is shorter, and the life of Pipe Network System is longer.

6. In terms of Shuttle use and operation: Tell the Shuttle where to go, and no other operation.

7. In terms of time efficiency: Intelligent Control System automatically controls the entire STS, eliminating the Manual Driving Risks, breaking the conventional speed bottleneck, realizing the global scope, all day, all-weather, unlimited speed driving, unattended, driverless, optimized path, non-stop, non-blocked, private special delivery, Unistop, minimizing the time cost, invalid time approach zero.

8. In terms of parking: The dual function of Online Driving and Online Parking is realized, which eliminates the parking problem and saves comprehensive resources.

9. In terms of risk of accidents: It breaks the routine of risk control methods with low reliability that lacked traffic safety and error-proofing measures and relied mainly on human security and regulatory constraints etc., since the beginning of motor vehicles. And eliminates most of the causes of accidents, breaks the more accident causal chains, making the risk approach zero, accidents approach zero and casualties approach zero. Even in the event of a collision, it will not burn or explode.

10. In terms of safety and reliability: It realizes fully automatic intelligent control, driverless, real-time self-diagnosis and self-correction and self-balancing, which improves the reliability, safety, efficiency, accuracy and prediction of the whole system.

11. In terms of public events: Fundamentally eliminates the existing public places and consolidation transport mode, making travel safer, sanitary and private. Both save resources and eliminate the public health events (such as COVID-19 dense infection) outbreak, difficult to control or out of control, epidemiological investigation, disinfection and control can be done instantly and automatically; at the same time, it also eliminates the occurrence of public safety events approach zero.

12. In terms of vehicle and traffic globalization: Leading the standardization and interoperability of global road networks and Shuttles, breaking the practice of differentiation among urban, intercity and international traffic vehicles, and realizing nationwide and even global common use and access.

13. In terms of resources and environmental protection: used high-efficiency, zero-emission electricity energy, significantly reducing or even eradicating the resource waste and environmental pollution in various links related to fuel, vehicles and roads; Greatly reduce the cost of road construction, reduce the road construction cycle and reduce pollution, abate the vehicle manufacturing process links and processing cycle, significantly reduce the pollution and vehicle manufacturing-related energy-consuming industrial chain, such as rubber manufacturing, tire manufacturing, smelting, casting, machining, glass manufacturing, paint manufacturing and spraying, maintenance, etc., resources and the environment will be sustainable protection. Energy savings of about 80%, lane width reductions of more than 30%, lane height reductions of more than 60%, and offline parking spaces zeroed out.

Beneficial Effects at the Added Functional Level:

1. To provide more services of P/C for military, police, students, doctors, confidential, postal and other related personnel or cargos.

2. To make access to Specific Areas more convenient, safer, and not limited by time and space, and to achieve a greater range of seamless connection and Unistop.

3. Put out fires and reduce casualties and losses in a timely manner.

4. Minimize the time between the onset of illness and the administration of help to buy more life-saving time for the patient.

5. Cut off the Accident causal chains, especially serious accidents are highly unlikely to occur.

6. Timely detection and termination of passenger behavior that poses a threat to life or the traffic system.

7. Optimize Shuttle routes to ensure the shortest time duration for different routes.

8. Easily collect, analyze and process all kinds of traffic big data, carbon emission contribution data, etc.; increase the initiative, optionality and convenience of driving by Shuttle; moreover, through big data analysis, optimization and prediction capabilities, we can obtain the decision basis of how to optimize traffic distribution, city planning, industry construction, national policies, and even national development strategies.

9. No ticket no-actions cloud payment, so that travel is greatly convenient, more resource-saving, reduce waste and pollution.

Beneficial Effects at the Level of User Experience and Consumer Awareness:

1. Changing transportation consumption habits, travel patterns and cultivating green consciousness, all trips will become faster, more private, comfortable, fun, economical and green, and will make people more willing to give up their high consumption, high pollution and low efficiency private vehicles and take Shuttles instead, advocating green travel.

2. Compared with the conventional vehicles or private car, taking STS is "spending bus fare, taking driverless Shuttle", which is economical, fast, comfortable, not fatigue, and protects privacy, but no longer worry about buying, refueling, charging, maintenance, inspection, parking space, parking, care, etc., not to worry about travel safety.

3. All day all-weather travel, unlimited speed, no congestion, no stopping en route, no accompanying, no transfer, no waiting, cloud payment, shorten the travel time by about 80%, the whole process of sitting and resting, entertainment, office at will. Safe, convenient, high-speed, direct access. Let people get the relaxation, pleasure and satisfaction of "taking the Shuttle, arriving in a while".

Economic Benefits:

1. By modifying passenger-vehicle elements, adding new functions, and further optimizing constituent elements, the shuttle forms a new type of transport vehicle which, when integrated as a unified whole with transportation infrastructure such as the pipe network, constitutes a fully interoperable, interchange-style STS; this disruptively covers urban and intercity corridors across a wide speed domain and long spans, including high-speed (see "Terms and Symbols: v_high") and ultra-high-speed operations, thereby yielding significant and substantial benefits in improving energy efficiency and capacity, reducing waste of material and social resources, and lowering manufacturing and time costs (see "Embodiment 10"). The STS unmanned operation and control has enabled significant savings in labor costs.

2. STS alone can reduce to a great extent: The length of time in transit, invalid time, drivers, police, road personnel, parking space occupation, road occupation, driver training, vehicle ownership, vehicle management, vehicle industry chain links, fuel-related links, traffic accidents and loss of life and property, resource waste, etc. The economic benefits generated by the savings alone are incalculable.

For example, a city's average morning peak congestion duration in 2018 was 2 hours and 50 minutes, the city's total annual weekday motor vehicle trips totaled 22.84 million, the peak passenger trips accounted for 42.6 percent of all day passenger trips, the evening peak accounted for 35.4 percent of all day trips, and the city's average annual wage for employed persons was RMB94,258 yuan. Implementation of STS, calculated for the city only, for the morning and evening peaks only, for motor vehicles only, and for the congestion time item in the ineffective time only, translates into a time cost of RMB2,252.7 million yuan in lost revenue in 2018.

3. Industries related to vehicles and STS can significantly reduce the cycle and cost of construction and operation and maintenance of the road network and its supporting facilities, significantly reduce the service supporting functions and expenditure, significantly shorten the multi-industry chain, including vehicles, simplify the manufacturing process, eliminate the vehicle operation and maintenance links, eliminate fuel processing storage and transportation links, significantly reduce the negative impact on the environment and environmental management investment, etc. At the same time, with the significant increase in operational efficiency, the vehicle and STS-related industries to support the economic development provided and pull up, the value of both open-source and cost-saving is too large to estimate. The new business format of transportation formed by STS also brings huge economic benefits to the global economy.

Social Benefits:

1. The present invention fills the technological gap in near-ground, ultra-low-altitude, ultra-high-speed transportation systems and shapes the future architecture of vehicles and transportation, providing new possibilities for rapid connectivity between future urban agglomerations and intercity regions. The invention herein constructs a new system model and standard framework of Shuttle transportation for future human beings, providing the most effective, fastest, lowest cost, safest and most environmentally friendly transportation guarantee for human economic activities. At the same time, statistical traffic information will be more comprehensive and precise. This will also be the new mode and development direction of land transportation in the future.

2. New Business Format: The invention herein is based on IICB, and integrates the shuttle with road network, service, urban planning and other multi-industrial integration, defines and innovates and invents an IoT-based Transportation Shuttle and Shuttle Traffic System, which is a new business format and new concept of transportation for global green travel and green consumption. Shuttle and STS will be the future leader and maker of the world's transportation rules, which can provide technical and economic support for the whole world. It will solve the world's transportation problems and create immeasurable value for the transportation and economic development of all countries in the world.

3. Global sharing: The invention herein belongs to the future transportation equipment of mankind and its supporting traffic system infrastructure, it can be implemented globally, opening up the transportation veins between countries and realizing a new future transportation order of global unity, resource sharing and global access, which will in turn bring great benefits to all mankind.

4. Green Revolution and Sustainable Transportation: Firstly, it drastically removes conventional vehicles and 2TS-related signals, road signs, parking spaces, road administration, petrol stations, crude fuel extraction, fuel manu-
facturing, storage and transportation, patrolling traffic
police, maintenance points, driver training, etc., which
reduces the resource waste, environmental pollution and
safety risks, and improves the living environment of human
beings. At the same time, through the greater popularization
and use of Shuttle and clean energy, to cultivate people's
transportation habits of green travel, green consumption.
Ultimately, Shuttle transportation will play an important role
as part of the community of human destiny for the realiza-
tion of the concept of sustainable development of human
beings, which is low carbon and environmental protection
and resource sharing.

5. Shuttle Effect: Due to the creation of Shuttle and
Shuttle Traffic, which are involved in a wide range, includ-
ing globally, it can reduce resource extraction, processing,
transportation, consumption, and reduce other pollution
from industries that process, manufacture, and transport
products related to a variety of vehicles, which will inevi-
tably lead to the transportation related to many high-pollu-
tion, high-energy, high-resource-input industries, enter-
prises, or processes to carry out a large-scale green
revolution, thus, which will trigger a series of cross-industry,
multi-industrial, multi-directional global green action,
resulting in a chain reaction, the formation of the shuttle
effect, and to promoting a huge transformation of the various
industries, all levels, and various aspects.

For example, just one item of fuel for 14,354,800 road-
operated vehicles and 205,749,300 private vehicles in one
country at the end of 2018, based on the average fuel
consumption of 6 liters per vehicle per 100 kilometers, if the
Shuttle replaces 70% of the existing vehicles, it will reduce
fuel usage by about 277,324 million liters (Note: Assuming
an average annual mileage of 30,000 km per vehicle per
year. Saving Fuel≈0.7*(14,354,800+205,749,300)
*30000*6/100), reduce carbon dioxide emissions by about
558,126 million kilograms (Note: Assuming EF of carbon
dioxide≈2 kg/L. Reduce carbon dioxide emissions≈Saving
Fuel*EF=277,324*2), and reduce heat emissions by about
8,538,934,544 million kilojoules per year (Note: Assuming
LHV of fuel oil≈30791 KJ/L. Reduce heat emissions,
Q≈Saving Fuel*LHV=277324*30791). Together with the
fuel-related industries all reducing the corresponding
amount of output to achieve zero emissions, its social value
and significance is self-evident. Only the Shuttle itself, by
shifting to electricity energy instead of fuel, will propel the
world toward achieving the carbon peak and carbon neutral
goals ahead of schedule.

BRIEF DESCRIPTION OF THE DRAWINGS

1. Co-description of FIG. 1, FIG. 2, and FIG. 3.

In FIG. 1, FIG. 2, and FIG. 3, solid one-way arrows
indicate a support relationship, with the arrows pointing to
supported objects; dashed two-way arrows indicate a com-
munication relationship, with one end of the arrows pointing
to Communication System body, the other end of the arrows
pointing to objects that need to be communicated with, if the
other end of the arrow pointing to the dashed box, all the
objects in the box are communication objects.

Figure 1:
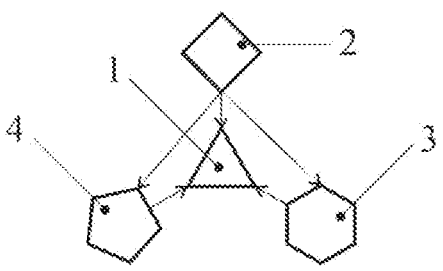
FIG. 1, FIG. 2, and FIG. 3 represent only schematic
diagrams of the major components included in the STS
system and the logical relationships required to realize the
functions, and do not represent compositional details or
location relations.

The numerical numbers in FIG. 1, FIG. 2, and FIG. 3
(except for 00 in FIG. 3) correspond to the numbers and what they represent in Table 1 below, and the numerical
numbers represent the major components of STS.

Note: The numerical number 00 in FIG. 3 is just a
temporary code for the regional STS, which may cover a
larger or smaller area and is a nested composite of the
composition shown in FIG. 2. A regional STS can be a
Section STS, a District STS, a City STS, an Intercity STS,
or a National STS.

2. FIG. 1 Description: FIG. 1 shows a schematic diagram
of the logical relationship of STS macroscopic composition
and each STS Parent System. In FIG. 1, 1 Shuttleway
System, 2 Control-Safeguard System, 3 Emergency
Response System, and 4 Data System. FIG. 1 shows the
macroscopic composition of STS. Note: Subordinate struc-
ture, see Table 1.

3. FIG. 2 Description: FIG. 2 shows a schematic diagram
of the logical relationship of the basic STS components, the
major STS Child Systems and the major STS Grandchild
Systems. In FIG. 2, 11 Pipe Network System, 12 Shuttle
System, 2401 Stop System, 1103 interchange system, 2402
Intercity Service System, 21 Energy System, 22 Intelligent
Control System, 23 Communication System, 24 Service
System, 25 Safety System, 31 emergency system, 41 Data
System. FIG. 2 shows the smallest unit of STS. Note:
Subordinate structure, see Table 1.

4. FIG. 3 Description: FIG. 3 shows a schematic diagram
of the logical relationship of the intercity or international
composition of STS, the major STS Child Systems and the
major STS Grandchild Systems. In FIG. 3, 00 regional STS,
11 Pipe Network System, 12 Shuttle System, 1103 inter-
change system, 2402 Intercity Service System, 21 Energy
System, 22 Intelligent Control System, 23 Communication
System, 24 Service System, 25 Safety System, 31 emer-
gency system, 41 Data System. FIG. 3 shows the nested
combination of the minimum units formed by FIG. 2 to form
the regional STS, and the logical relationships of the dif-
ferent regional STS.

TERMS AND SYMBOLS

Control cycle/scheduling cycle (T_ctrl): The periodic
execution cadence of Intelligent Control System (ICS) or
In-Shuttle Intelligent Control System (IICS) used for limit-
ing, smoothing, and interlocking; no specific numeric value
is fixed and it is determined by operational conditions.

ICS/IICS closed loop: State perception→path/scheduling-
→speed/braking/ISS commands; executed with period
T_ctrl and subject to safety thresholds (including minimum
ISS and jerk/jerk limit, etc.) for limiting and smoothing.

Channel yielding/Non-fixed emergency channel: A tem-
porary yielding action or assigned channel resource taken by
the ICS under conditions such as priority passage, conges-
tion, accident, first aid, or fire, meeting clearance/safety
requirements.

v_high/v_ultra (speed bands): Speed banding exists and is
used for policy switching; safety thresholds tighten mono-
tonically with the speed band (no specific boundary values
are fixed).

Upper speed bound or acceleration/deceleration: No spe-
cific value is fixed; it is jointly constrained by the maturity
of the MLMD propulsion technology at the stage of appli-
cation and the safety thresholds enforced by the ICS/IICS (a
current reference maglev speed is 600 km/h).

"High-speed" and "ultra-high-speed": "High-speed"
means v_high≥200 km/h; "ultra-high-speed" means v_ul-
tra≥400 km/h.

Cooperative operation: Under unified coordination, scheduling, and constraints of operating parameters and control commands, all shuttles remain within a bounded safe operating process/state. Typical cases include, without limitation: yielding, following, synchronized arrival, or end-to-end coupling. During cooperative operation, information exchange among shuttles is coordinated and relayed by Intelligent Control Communication System 2301 and Communication System 23.

Operating parameters and control commands: Generated and issued by Intelligent Control System 22 based on global and/or local operating data of the STS, mission tasks, priority levels, trigger information, and safety constraints.

Operating parameters include at least one of: PDR; target speed profile; and ISS. Operating data include at least one of: operating state; position; speed; ISS; passenger status; and environmental/safety data.

Operating states include at least: online driving; online parking; stop docking; and channel yielding.

Streamlined profile: Overall drag coefficient Cd≤0.25; envelope profile, see "Embodiment 10."

Pipe network: Abbreviation for the transportation network formed by pipe network unit; full term "pipe network system."

Preferred dynamic route: A route dynamically solved by Intelligent Control System 22 from origin to destination to enable Unistop service; it is selected by real-time evaluation under preset criteria as the route with the shortest predicted driving time. The route is not merely a navigation suggestion and is non-fixed; it is dynamically adjusted, regenerated, and re-routed with closed-loop control as monitoring data and tasks change. It is generated in three ways: by using currently unobstructed segments, by means of channel yielding, or by a combination of the two.

Standard modules: Modularized/unitized structural elements standardized across the system, including but not limited to: pipe network unit (standardized structural unit of "Pipe Network System"); magnetic-guideway unit (standardized structural unit of "Magnetic-Guideway System"); interchange unit (standardized structural unit of "Interchange System"); stop unit (standardized structural unit of "Stop System"); pipeline sensing unit (standardized structural unit of "Pipeline Sensing System"); cabling unit (standardized structural unit of "Cabling System"); emergency egress corridor unit (standardized structural unit of "Emergency Egress Corridor System"). Units can be assembled, extended, and nested, and possess compatibility and interchangeability to support extension of the pipe network and seamless interconnection to specific areas. "Standard modules," "modules," and "units" express the same concept.

Quasi-real-time: The ICS/IICS execute control and scheduling with period T_ctrl meeting T_ctrl≤T_max with allowable jitter (non-hard-real-time); used for limit, smoothing, and interlock updates. No specific numeric value is fixed. Abbreviated as "real-time."

As-high-as-practicable speed: The highest speed achievable under safety thresholds across different road conditions, segments, areas, and operating phases, forming a continuously transitioning target speed profile that covers a wide speed domain from conventional to ultra-high speed. The target speed profile is constrained by the upper speed threshold determined by Intelligent Control System 22 and implements speed-up and smooth switching when safety policies and energy constraints are satisfied.

Optimized load (optimized capacity): corresponds to a preferred capacity of 1+1 occupants, unless otherwise stated.

Operation-control modes: As used herein, collectively refers to the control and operation states of the shuttle under the coordination of the ICS and IICS. The operation-control modes may include parameters or submodes such as a preferred dynamic route, a target speed profile, an unmanned automatic mode, or an emergency intervention mode. These modes are not new structural features but functional expressions summarizing the operation and control mechanisms disclosed in the present specification.

Shuttle Transportation System (STS): It is used interchangeably with "Shuttle Traffic System," both referring to the integrated shuttle-based transport and control system described herein.

Transport Shuttle: As used herein, "Transport Shuttle", "Transportation Shuttle", "shuttle system" and "shuttle" are used interchangeably and may be abbreviated as "shuttle" (regardless of capitalization and the use of articles), all referring to an individual shuttle system configured for passenger or cargo transport within the STS. For clarity, "Shuttle Transportation System (STS)" refers to the overall transportation system, whereas "shuttle" refers to the individual transport vehicle/pod within the STS, i.e., a discrete vehicle/pod unit that serves as a constituent unit/component of the STS.

DETAILED DESCRIPTION OF THE INVENTION

The best implementation of the invention herein is: A Passenger Shuttle load of 1+1 persons, globally harmonized standard modules, design speed upper threshold as high as possible, as many stops as possible and inserted them in Specific Areas. Specifically, as follows:

1. The composition and numbering of the STS framework, Parent Systems, Child Systems and Grandchild Systems, which is shown in Table 1 below:

TABLE 1

| Framework | Parent System | Child System | Grandchild System |
|---|---|---|---|
| Hard Body | Shuttle-Tunnel System 1 | Pipe-Tunnel System 11 | Pipeline System 1101, Magnetic-Road System 1102, Interchange System 1103, Station System 1104, Pipeline Sensing System 1105, Cabling System 1106, Escape Route System 1107 |
| | | Shuttle System 12 | Shuttle Body System 1201, Leviation-Driving System 1202, Standby Driving System 1203, In-Shuttle Positioning System 1204. Air Conditioning System 1205, Lighting System 1206, Audio-Visual Interaction System 1207, |

TABLE 1-continued

| Framework | Parent System | Child System | Grandchild System |
|---|---|---|---|
| | | | In-Shuttle Sensing System 1208, In-Shuttle Safety System 1209, Identification System 1210, In-Shuttle Communication System 1211, In-Shuttle Intelligent Control System 1212, Wiring Harness System 1213, Seat System 1214 |
| Soft Combination | Control-Safeguard System 2 | Energy System 21 | Power Distribution System 2101, Energy Saving System 2102 |
| | | Intelligent Control System 22 | Intelligent Central System 2201, Manual Control System 2202, Human-Computer Interaction System 2203, User Control System 2205 |
| | | Communication System 23 | Intelligent Control Communication System 2301, Information Communication System 23202 |
| | | Service System 24 | Station Service System 2401, Intercity Service System 2402, Inspection-Repair System 2403, Operation-Maintenance System 2404, Parking System 2405, Cleaning System 2406, Shuttle APP 2407 |
| | | Safety System 25 | Cause Monitoring System 2501, Personal Protection System 2502, Health Monitoring Trigger System 2503 |
| | Emergency Response System 3 | Emergency Response System 31 | Health Emergency Response System 3101, Accident Emergency Response System 3102, Fire Emergency Response System 3103 |
| | Data System 4 | Data System 11 | Data Collection System 4101, Data Analysis System 4102, Data Storage System 4103 |

2. In Table 1, the STS framework and functional realization:

Hard Body, which is mainly represented by the hardware required for protection and transportation, is the main part of the STS transportation function. One of the main functions: guarding Shuttle and Soft Combination, which is realized by Pipeline System 1101; the second of the main functions: automatic transporting passengers and cargo, which is realized by Shuttle System 12.

Soft Combination, which is mainly represented by the software and services required for control and service, is the peripheral part that guarantees the automatic operation of the transport body of STS. One of the main functions: Controlling the automatic operation of Shuttles and the communication links and data acquisition among the various components, which is jointly accomplished by Intelligent Control System 22, Communication System 23, and Data System 41; The second of the main functions: Providing support services such as energy, security, emergency and service for entire STS, which is accomplished by Energy System 21, Safety System 25, Emergency Response System 31, and Service System 24. Note: The hierarchical breakdown of Intelligent Control System 22 and the composition, spatial relations, and functional realization of its subsystems and sub-subsystems are provided in Section 7.4; this section serves only to harmonize terminology and references.

3. In Table 1, Composition and functional realization of Parent System of STS:

Shuttleway System 1, which provides the framework for all the facilities of the road network and carries passengers and cargos.

Control-Safeguard System 2, which controls and guarantees the automatic operation of all systems.

Emergency Response System 3, when abnormal, to deal with various emergency events.

Data System 4, which processes all data information, and the data is used by Control-Safeguard System 2.

4. In FIG. 1, The operational logic relationships among the Parent Systems:

In FIG. 1, The Shuttle traffic is divided into two major parts. First, Shuttleway System 1 constitutes the transport body of STS. Second, Control-Safeguard System 2, Emergency Response System 3 and Data System 4 constitute the STS intelligent control linkage, the intelligent control linkage plays a supporting and guarantee role for STS.

When normal, In FIG. 1, Control-Safeguard System 2 automatically controls Shuttleway System 1 and Data System 4 to complete the coordinated operation of the three major Parent Systems, the three are in interactive feedback, correction, command, response, correction and storage mode.

When abnormal, In FIG. 1, Emergency Response System 3 is activated, and Control-Safeguard System 2 automatically controls the coordinated operation of the four major Parent Systems of Shuttleway System 1, Emergency Response System 3 and Data System 4, the four are in interactive feedback, correction, command, response, correction and storage mode.

5. In Table 1, Composition and functional realization of each Child System of STS:

Pipe Network System 11, which provides space for Shuttle System 12 to drive, provides space for other systems to lay out hardware.

Shuttle System 12, which drive in Pipe Network System 11, transports passengers or cargos.

Energy System 21, which provides energy for the entire STS.

Intelligent Control System 22, which sends commands and coordinates the operation of the various parts of STS through Communication System 23. Intelligent Control System 22 centrally generates operating parameters and control commands, and performs dispatch/allocation and safety management.

Communication System 23, a communication hub among Intelligent Control System 22 and the various parts of STS, provides applications for human-human dialog and human-machine dialog.

Communication System 23 implements bidirectional communications; the categories of exchanged information include at least: (1) operating data (position, speed, operating state, passenger status, environmental and safety data, etc.); (2) operating parameters (target speed profile, ISS, PDR, etc.); (3) control commands; (4) service information; and (5) passenger interaction information.

Service System 24, which provides related services for Pipe Network System 11, Shuttle System 12, and passengers.

Safety System 25, which provides safety measures and security for Pipe Network System 11, Shuttle System 12, and passengers.

Emergency Response System 31, which provides emergency response to Pipe Network System 11, Shuttle System 12, and passengers in the case of an emergency.

Data System 41, through Communication System 23, process the data of the whole system, and the data serves as the basis for the commands and coordination of Intelligent Control System 22.

Figure 2:
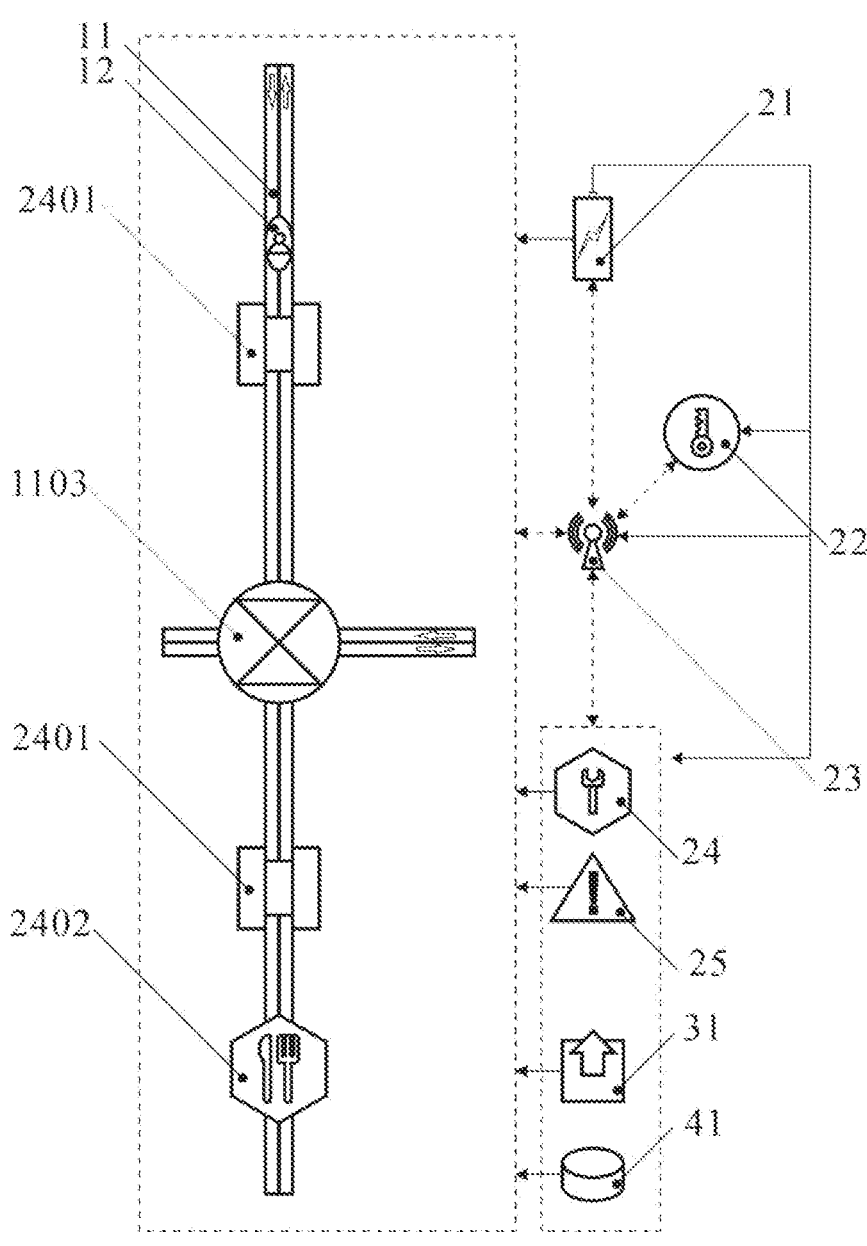

6. In FIG. 2, The operational logic relationships among the major Child Systems and some of the Grandchild Systems:

In FIG. 2, The smallest unit of STS operating independently from which a regional STS may be constituted.

In the large dashed box on the left side of FIG. 2, the main systems such as Pipe Network System 11, Shuttle System 12, Stop Service System 2401, Interchange System 1103 (when there is an intersection), and Intercity Service System 2402 (when there is an intercity Pipeline) constitute Shuttleway System 1 in FIG. 1, which is the smallest module of STS operation. Among them, Pipe Network System 11 provides space for the operation passageway and route of Shuttle System 12, and for other hardware deployed along the route. Shuttle System 12 is the transport equipment for carrying passengers or cargos, Stop Service System 2401 is distributed at the appropriate locations of Pipe Network System 11, Interchange System 1103 is laid out at all intersections, and Intercity Service System 2402 is distributed in the intercity section of Pipe Network System 11.

On the right side of the large dashed box in FIG. 2, the main systems such as Energy System 21, Intelligent Control System 22, Communication System 23, Service System 24, and Safety System 25 constitute Control-Safeguard System 2 in FIG. 1. Among them, Energy System 21 provides electricity energy support for all systems, Intelligent Control System 22 is the control center of all systems, Communication System 23 is the communication hub among systems, Intelligent Control System 22 communicates commands and data with each of the other systems and controls them through Communication System 23, Service System 24 provides a variety of standing and temporary service guarantees for the system, and Safety System 25 provides safeguards for reducing various security events.

On the lower side of the small dashed box on the right side of FIG. 2, Emergency Response System 31 forms Emergency Response System 3 in FIG. 1. Emergency Response System 31 handles all types of emergencies.

On the lower side of the small dashed box on the right side of FIG. 2, Data System 41 forms Data System 4 in FIG. 1.

Data System 41 handles all data information, including acquisition, analysis, and storage.

7. In Table 1, Composition, location relations and functional realization of each Grandchild System:

7.1. In Pipe Network System 11, Composition, location relations and functional realization of each Grandchild System:

Pipeline system 1101, which separates the moving Shuttle from everything outside the pipe, provides deployment space and protection for Shuttle System 12, Magnetic-Guideway System 1102, Interchange System 1103, Stop System 1104, Pipeline Sensing System 1105, Cabling System 1106, Emergency Egress Corridor System 1107, etc.

Magnetic-Guideway System 1102, which provides a guideway for the Shuttle, and acts in conjunction with MLMD 1202 to form a magnetic levitation force and a magnetic driving force to hold up, drive and break the Shuttle. Magnetic-Guideway System 1102 and the MLMD 1202 generate the primary propulsive magnetic force through magnetic interaction and, together with MB, accomplish acceleration, deceleration, and stopping control; accordingly, the shuttle does not independently provide the primary propulsion via an onboard propulsion unit.

Interchange System 1103, which is located over all intersections in Pipeline System 1101, eliminates the need for stopping at intersections.

Stop System 1104, which is located at appropriate locations within Pipeline System 1101, provides space for Shuttle stopping, passenger boarding and alighting, or cargo loading and unloading. As used herein, the term "stop" refers to a node or point within the pipe network of the STS for passenger boarding and alighting or cargo loading and unloading, and is unrelated to any stop in conventional bus or railway systems.

Pipeline Sensing System 1105, which is located at appropriate locations in Pipeline System 1101, senses information such as road conditions, shuttle conditions, shuttle speed, shuttle position, route, and the like, alone or in conjunction with In-Shuttle Sensing System 1208.

Cabling System 1106, which is laid in Pipeline System 1101, contains the lines of energy, communication, intelligent control, etc., to transmit power, data, commands, and the like, respectively.

Emergency Egress Corridor System 1107, which is separated from the driving passageway, is used for the escape or access of relevant personnel, such as emergency escape, inspection and maintenance, and accident handling, etc.

7.2. In Shuttle System 12, Composition, location relations and functional realization of each Grandchild System:

Shuttle Body System 1201, which provides layout space for the other Grandchild Systems of Shuttle System 12 and passengers or cargos, including door and escape port, etc. It presents a shape that is more conducive to reducing wind resistance, and Passenger Shuttles and Cargo Shuttles are miniaturized (see "Embodiment 10". Passenger shuttle load not exceeding 4 persons and optimized for 1+1 persons (preferred capacity), with the possibility of exclusive rides alone and voluntary carpooling or putting luggage in to minimize empty loads; cargo shuttle limited to light/small goods.), lightweight, intelligent, MLMD, and driverless. The shuttle state information obtained by its In-Shuttle Sensing System 1208 and Pipeline Sensing System 1105, through In-Shuttle Communication System 1211 and Communication System 23, which is intelligently interacted with Intelligent Control System 22, immediately Intelligent Control System 22 makes all kinds of commands, these commands act on the Shuttle and other systems to make them present different states, in order to complete the functions of passenger getting on and off or cargo loading and unloading, driving, optimizing route (Executed with period T_ctrl; subject to thresholds such as S_min and a_max and to interlock rules.), braking, parking, etc., and realize Unistop.

MLMD 1202 and Magnetic-Guideway System 1102 interact with each other to realize the Shuttle's MLMD and MB functions, and complete the actions of levitation, driving (i.e., forward, backward, lane-changing) and stopping.

Backup Drive System 1203, provides Shuttle System 12 with a backup driving to be used for a short period of time in case of repair or emergency; the Backup Drive System 1203 comprises a backup instance of MLMD (see, e.g., [0080]).

In-Shuttle Positioning System 1204, together with In-Shuttle Sensing System 1208 and Pipeline Sensing System 1105, determines the precise position and performs ranging of the Shuttle, and transmits related data to Intelligent Control System 22; the distance information between the front and rear of the shuttle sensed by In-Shuttle Positioning System 1204 and Pipeline Sensing System 1105, and the relevant information of Safety System 25, which are transmitted to Intelligent Control System 22 via In-Shuttle Communication System 1211 and Communication System 23. The above information is analyzed comprehensively by Intelligent Control System 22, to provide the Shuttle with collision avoidance measures (e.g., acceleration and deceleration, braking, and stopping, etc.). In-Shuttle Positioning System 1204 and In-Shuttle Sensing System 1208 cooperatively perform positioning and ranging functions to support collision avoidance.

Air Conditioning System 1205, Lighting System 1206, respectively, realize the functions of regulating the temperature, oxygen content, lighting in Shuttle.

Audio-Visual Interaction System 1207, which provides passengers with Individual and interactive entertainment audio-visuals and realizes human-machine dialog with Intelligent Control System 22, or communicates with STS staff, medical personnel, friends, guardians, etc. Meanwhile, passenger-side submission of ad hoc requests and entry of personal information are supported; operating-information prompts and safety alerts are provided, including but not limited to: the operating route and current location, boarding/alighting times and fares, riding instructions and alighting reminders, violation warnings, safety alarms, and emergency guidance.

In-Shuttle Sensing System 1208, which contains sensing items for positioning, ranging, collision avoidance, health, etc., senses the Shuttle's operating state and position, environmental data in Shuttle (including temperature, humidity, and air quality), passenger health status (such as vital signs), among other information, and other information, and combines with Pipeline Sensing System 1105 to complete the Shuttle's comprehensive sensing data, through In-Shuttle Communication System 1211 and Communication System 23, which is fed to Intelligent Control System 22 for corresponding processing.

In-Shuttle Safety System 1209, which contains sensing devices, alarm devices, airbags, seat belts and fire extinguishers to provide sensing, alarming and protection for safety in the Shuttle.

Identification System 1210, which is used to sense the identity of the passenger or the cargo and compare it with the big data information in the library of Data System 41, is used for Intelligent Control System 22 to make the corresponding disposition commands (e.g., whether it is suitable for the ride, push the normal route, friendly reminder, special attention, lock the trajectory, lock the end point, etc.).

In-Shuttle Communication System 1211, which is located within the Shuttle, has communication channels in the form of wired and wireless. It transmits various information or needs originating from Pipe Network System 11, Shuttle System 12, Health Monitoring Trigger System 2503, In-Shuttle Safety System 1209 and the passengers to In-Shuttle Intelligent Control System 1212 or/and Intelligent Control System 22 via the communication channels and, if necessary, to the relevant processing terminals, institutions or individuals.

In-Shuttle Intelligent Control System 1212, which is the on-board part of Intelligent Control System 22, is the execution end and information return end of Intelligent Control System 22 inside the Shuttle, and the passenger or receivers/shippers can give the corresponding need or instruction information to the Shuttle. it operates in a non-autonomous mode.

Wiring Harness System 1213, which is wired between shells and interiors of Shuttle Body System 1201, provides wired signal communication or electricity energy transmission to the various Grandchild Systems of Shuttle System 12.

Seating System 1214, which is mounted on the frame structure of Shuttle Body System 1201, can be seated or reclined.

7.3. In Energy System 21, Composition, location relations and functional realization of each Grandchild System:

Power Distribution System 2101, which is located throughout Pipe Network System 11, Intelligent Control System 22, Communication System 23, Service System 24, Safety System 25, Emergency Response System 31 and Data System 41, and distributes electricity for them.

Energy Saving System 2102, which is located in Pipeline System 1101 and/or Shuttle Body System 1201, works in concert with Intelligent Control System 22 to recover and utilize the energy generated by the high-speed moving Shuttles.

7.4. In Intelligent Control System 22, Composition, location relations and functional realization of each Grandchild System:

Central Control System 2201, as the control center of the fully automatic operation of the whole system of STS, with the help of different functional modules, which uses the IoT operation mechanism to exchange information with various other systems through Communication System 23, and carries out operation control and intelligent processing of the Shuttle and other systems, realizing various fully-automatic intelligent control mechanisms including driverless and Unistop.

Manual Control System 2202, which is used for manual control of a Shuttle or a section or an area during activities such as installation and commissioning, overhaul, maintenance, cleaning, emergency response, etc., can be switched with Central Control System 2201.

Human-Machine Interaction System 2203, which provides the necessary freedom of choice for the passenger, i.e., through a human-machine dialog between the passenger and Central Control System 2201, including the passenger providing personal health information or medical needs, wherein Central Control System 2201 determines whether the information is feasible and issues commands to meet the passenger's reasonable needs, such as switching endpoints, entering service areas, calling, or activating the Health-Emergency Response System 3101.

User Control System 2204, which is a temporary limited control that allows passengers to operate the Shuttle autonomously in case of emergency.

Special Control System 2205, in special situations (e.g., first aid, rushing to an examination, suspects riding in a Shuttle, military needs, etc.), which allows for manual intervention to initiate, or automatic judgment by Intelligent Control System 22 to initiate, certain special operations in order to ensure that the necessary special results are obtained.

7.5. In Communication System 23, Composition, location relations and functional realization of each Grandchild System:

Intelligent Control Communication System 2301, which is the link among Intelligent Control System 22 and other Child Systems and Grandchild Systems for automatic communication through the IoT, is controlled by Intelligent Control System 22 and receive and analyze information, and then issue the corresponding commands.

Information Communication System 2302, which is located at various points of STS, contains communication exchanges for civilian, police, military, etc., and does not involve commands for controlling the operation of the Shuttle.

7.6. In Service System 24, Composition, location relations and functional realization of each Grandchild System:

Stop Service System 2401, which is deployed in Pipeline System 1101, contains identification, destination statistics, stop guidance, temporary rest, timing of getting on and off, automatic fare deduction, etc. The stops layout location can be a conventional layout way of public transport station/stop/terminal/airport/wharf, or also be a Specific Area. It contains hardware and services.

Intercity Service System 2402, which is service area and related services laid out for the intercity section of Pipeline System 1101.

Inspection-Repair System 2403, which is a timed inspection and repair service for the entire STS system.

Operation-Maintenance System 2404, which is the assurance system for STS operations, is a routine system maintenance task.

Parking System 2405, which contains the different functional passageways involved in Pipeline System 1101, controls online parking in close proximity at different times. It may include pipelines or areas dedicated to parking, or parking areas for Inspection-Repair System 2403.

Cleaning System 2406, which is a complete guarantee system for cleaning, decontamination and maintenance activities on the inside and outside of the Shuttle, Pipe Network System 11, etc., may also include the cleaning needs brought about by different weather.

Shuttle APP 2407, which is a client for passengers or consignors to obtain all kinds of travel information, book Shuttles, preset a destination, book a ride with a passenger or a carpool, participate in surveys, evaluate complaints, identify a guardian, and other services, facilitates improving the operation efficiency of Shuttle, and increases the goodwill of passengers and the affinity of the Shuttle.

7.7. In Safety System 25, Composition, location relations and functional realization of each Grandchild System:

Cause Monitoring System 2501, which is a combination of hardware and software for monitoring and controlling the causes that may lead to accidents in the STS system, and its monitoring data, via In-Shuttle Communication System 1211 and Communication System 23, is sent to Intelligent Control System 22 and Data System 41 for processing and making various disposal commands or information release such as accident prediction, warning, elimination, avoidance, and emergency response etc. Its principal monitoring items include at least: pipeline and magnetic-guideway status; power-supply status; shuttle status; functional status of MLMD, magnetic drive, and magnetic braking; sensor-system status; communications status; and passenger status; as well as the reliability and stability of monitoring and sensing, the accuracy and timeliness of control commands, the execution and feedback response speed, actuator faults, component detachment or aging, potential fire hazards, and defects in control logic and algorithm design.

Personal Protection System 2502, which is a relevant measure and response mechanism for protection of personal safety set up in Pipe Network System 11, Shuttle System 12 and other systems, comprises In-Shuttle Safety System 1209.

Health Monitoring Trigger System 2503, which utilizes In-Shuttle Sensing System 1208 to monitor the passenger's health throughout the travel process, or uses health information or medical needs provided by the passenger, and, after automatic judgment by Intelligent Control System 22, changes the end of travel or activates the Health-Emergency Response System 3101.

7.8. In Emergency Response System 31, Composition, location relations and functional realization of each Grandchild System:

Health-Emergency Response System 3101, in Shuttle Body System 1201, is used to monitor the main health indicators of the passenger, and after judgment by Intelligent Control System 22 automatically determines whether to directly reroute the passenger to a hospital or to give a recommendation for the passenger to make his or her own choice. And when there is an obvious abnormality in the vital signs, Intelligent Control System 22 automatically decides to activate a health-emergency rescue plan to send the passenger to the appropriate hospital, and at the same time notify the hospital and the guardian. The rescue plan consists of channel yielding to provide an emergency passage, accelerating to the hospital, calling the hospital, calling a guardian or friend, etc. Note: "Channel yielding" means that a shuttle yields passage space to another shuttle with a higher priority or for emergency needs (abbreviated as "yielding" or "giving way"); the shuttle's operating state at this time is "yielding state."

Accident-Emergency Response System 3102, which is composed of accident sensing devices that located in Pipeline System 1101 and Shuttle System 1201, constitutes the hardware of the system, and the accident or abnormal signals sensed therein are transmitted to Intelligent Control System 22 through Communication System 23, or the passengers make a call through Human-Machine Interaction System 2203, triggering Intelligent Control System 22 to initiate an accident-emergency response plan. The response plan includes emergency stopping, escape, first aid, retreating from accident points and more. Note: "Fire-emergency response" means that, under commands of Intelligent Control System 22, In-Shuttle Safety System 1209 and the Fire-Emergency Response System 3103 act in concert to perform emergency actions including fire suppression, emergency stopping, evacuation, and channel opening; the handling/process data are then transmitted via Communication System 23 to the Data System 41 for retention.

Fire-Emergency Response System 3103, When a fire occurs in Pipeline System 1101, Shuttle Body System 1201 or other hardware systems, Pipeline Sensing System 1105 and In-Shuttle Sensing System 1208 that are located on such hardware send a sensing signal to Intelligent Control System 22 to trigger the initiation of the fire-emergency response, and/or sent to the passenger via Audio-Visual Interaction System 1207 to activate the fire-emergency response. Fire-emergency response includes automatic sprinkler activation in Pipeline System 1101 and small fire extinguisher activation inside the Shuttle, as well as emergency stops, escapes, and rescues, etc.

7.9. In Data System 41, Composition, location relations and functional realization of each Grandchild System:

Data Collection System 4101, by various types of sensors that are located in Pipeline System 1101, Shuttle Body System 1201, and other parts, which senses and collects various types of information data containing passenger identity, stops, pipelines, passageways, energy, Shuttles, power levels, passenger flow, distribution, positioning, etc., and transmits the information to a data center of Data System 41 via In-Shuttle Communication System 1211 and Communication System 23.

Data Analysis System 4102, which performs comprehensive statistics and big data analysis on the above data, obtains data that facilitates a better passenger experience or obtains a decision basis for STS improvement. These analyzed data bases are used in Intelligent Control System 22 for resource allocation and balancing of the entire STS system, as well as for autonomous optimization and more effective control and expansion of Shuttles distribution and speed, or for pushing more valuable information to passengers, or for guiding engineers to improve the STS, etc. This autonomous optimization process, via a continual feedback-and-analysis loop, automatically adjusts system parameters across varying operating environments, ensuring that the STS maintains optimal performance and autonomous optimization under dynamic conditions.

Data Storage System 4103, which is placed in the cloud, provides storage space for the various data mentioned above for further analysis and recall.

Figure 3:
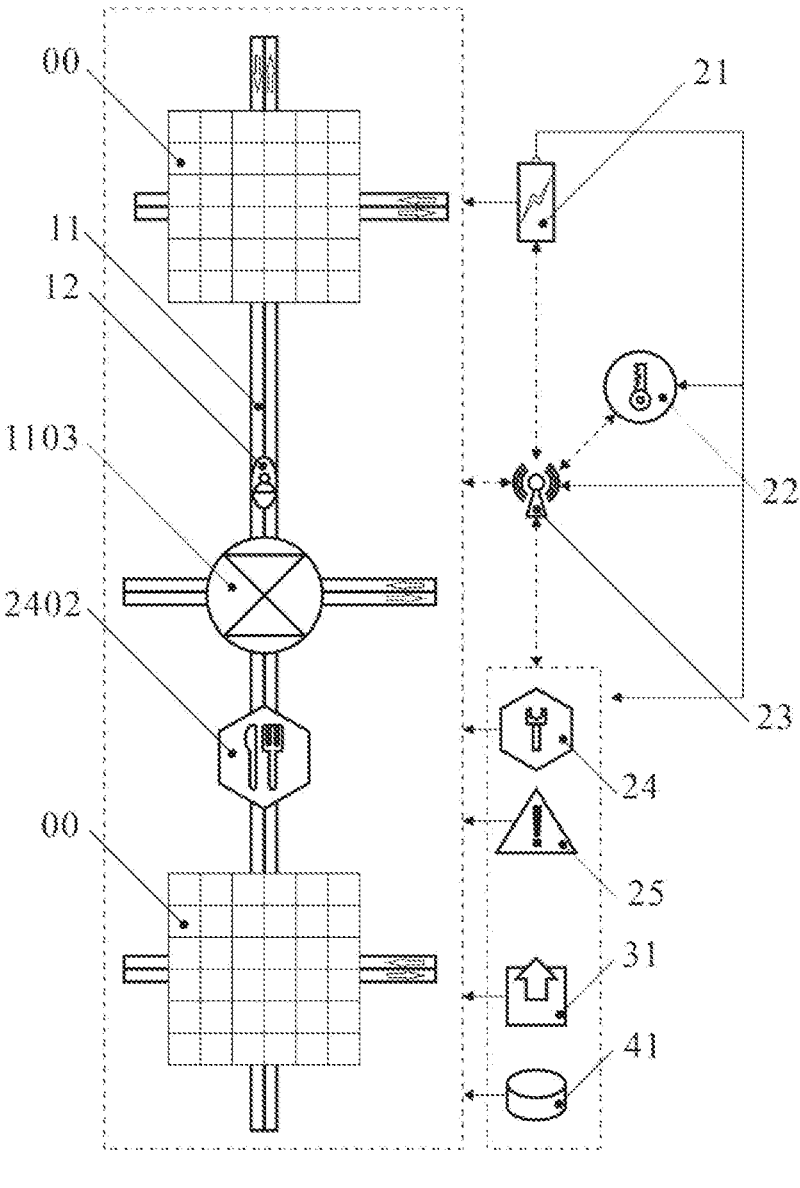

7.10. In FIG. 3, the logical relationships among the major Child Systems and Grandchild Systems:

Inside the large dashed box in FIG. 3, it is a nested combination of the basic STS operating units shown in FIG. 2, to form a larger regional STS.

In FIG. 3, 00 is just a temporary code for the regional STS, as mentioned above.

The right part of the large dashed box in FIG. 3 is equivalent to the right part of the large dashed box in FIG. 2, and is placed here to visualize each of the major components and logical relationships of an Intercity STS or Global STS.

BEST MODE FOR CARRYING OUT THE INVENTION

Embodiment 1, Implementation of Section STS

For example, Section STS between places A and B, 1 person (or 1+1 persons) will need to drive by the Shuttle:

Setting up a stop at each of places A and B, called A Stop and B Stop respectively, each include Stop System 1104 and Stop Service System 2401; and, above existing roadways or in non-road spaces, constructing a section of Pipe Network System 11 to connect A Stop and B Stop. One passenger (who may also ride with one family member, friend, or carpooler) rides a Shuttle after entering destination B at the terminal of A Stop, or inputs the destination via User Control System 2204 after boarding the Shuttle. After settling in Seating System 1214, the door of the Shuttle closes automatically, and Audio-Visual Interaction System 1207 reminds passenger to fasten seat belt. At the same time, Identification System 1210 in the Shuttle automatically confirms the passenger's identity and matches the permit with the destination to determine whether the P/C is available, and if NO, Central Control System 2201 sets the route as a regular lane (regular lane is also the shortest time duration preferred lane), if YES (such as military or law enforcement officers, students, doctors, etc.), the route is set as a priority lane or licensed lane, and if the passenger does not have the right to enter the destination, the passenger is reminded to modify the destination or is refused the ride. After that, Central Control System 2201 automatically controls Shuttle Body System 1201 to drive at the highest possible speed ("as-high-as-practicable speed," see "Terms and Symbols") on Magnetic-Guideway System 1102 in Pipeline System 1101, from A Stop straight to B Stop without any stops in between. Before arrival, Audio-Visual Interaction System 1207 automatically reminds passenger to get ready to get off the Shuttle (no need to worry about missing his/her stop, and no missing). When arriving at B Stop, the door will open automatically and passenger can get off the Shuttle with their bags. And then the Shuttle will automatically park online at an appropriate location in the pipeline, waiting for restart commands. During running, passenger may sit, lie down, or work, may use Air Conditioning System 1205, Lighting System 1206, may use Audio-Visual Interaction System 1207 to amuse himself or herself, or to link up and interact with others, or to change his or her destination. During running, if Health Monitoring Trigger System 2503 finds that the passenger's body is abnormal, then Health-Emergency Response System 3101 is triggered to alert the passenger and get in touch with the hospital and guardian, and if necessary, the emergency channel is directly opened and the route is changed to take the passenger to the nearest suitable hospital (assuming that the hospital has already set up a stop). During running, if Identification System 1210 further judges that the passenger has significant suspicion, it will automatically activate Special Control System 2205 to notify the police for verification, and if the passenger is indeed a suspect, the police will determine the disposition of the passenger and automatically record the passenger's trajectories, and, if necessary, directly lock the door of the Shuttle to detain the suspect to the Public Security Bureau (assuming that the Public Security Bureau has already set up a stop); During running, in case of fire, automatically trigger Fire-Emergency Response System 3103, and make an emergency stop, open the door, open the nearest Emergency Egress Corridor, automatically start the sprinkler system if necessary, or quickly drive away, exit or avoid the fire section in advance. The data related to the whole process is uploaded by Data System 41 through Communication System 23, directly to Central Control System 2201, and stored in Data Storage System 4103.

Embodiment 2, Implementation of District STS and City STS

Based on Embodiment 1, more stops are added at different locations in Place A, and by connecting each stop by Pipe Network System 11, Place A apartment complex STS is formed. Usually, three stops can form a District STS, and if the line to Place B is added, a larger District STS is formed, and so extended. The City STS is equivalent to a much larger District STS.

Embodiment 3, Implementation of Intercity STS

Based on Embodiment 2, constructing an Intercity STS from a Stop in City C to a Stop in City D (referred to as C Stop and D Stop), it is only necessary to add Pipe Network System 11 between the two stops on the outer edges of the two City STS to connect the two cities, and to add some Intercity Service System 2402 at appropriate spacing along the way. Get on the Shuttle from C Stop, then go through the City STS lane of City C, and then travel along Pipeline System 1101 between City C and City D. During running, the passenger may take a small break at some Intercity Service System 2402, and then, go through the City STS lane of City D, which can directly reach D Stop. The full route is the best path (best path=PDR) with the shortest time duration, and the Shuttle can drive between cities at much higher speeds, and Unistop. In the whole process, no need like 2TS: first take vehicle or drive from C Station—go to the train station or airport of City C for waiting—then take a high-speed train or a plane to the train station or airport of City D—take another vehicle to D Station.

Embodiment 4, Implementation of National STS or Global STS

The same manner of Embodiment 3 is extended by analogy to all parts of the country or the world, constituting National STS or Global STS.

Embodiment 5, Implementation of Inserting Stops into Specific Areas And Implementation of P/C If Pipe Network System 11 is extended to E Stop in scenic area, tourists from all over the country will get on the Shuttles at his or her doorstop, and get off the Shuttle to reach E Stop in scenic area. And if Pipe Network System 11 is extended to a school campus F Stop, students or teachers get on the Shuttles at his or her doorstop, by Identification System 1210 judged to be the school's students or teachers, Shuttle will be directly into the campus, no longer cross the road, and idle people will not be able to enter the campus.

Embodiment 6, Implementation of the Fire Extinguishing Function

If the fire sensor at a point senses fire information, it triggers Fire-Emergency Response System 3103, which, based on the sensed location, automatically activates the nearest sprinkler fire extinguishing function at that point, and at the same time, which automatically activates the entrance restriction function of the nearest G Stop and H Stop on both sides of that point, and automatically evacuates all shuttles in the GH section, automatically notifies related personnels to use manual operations of the emergency response plan.

Embodiment 7, Implementation of Online Parking Function

During low peak hours or other no temporary demand for Shuttle, Central Control System 2201 automatically arranges online parking in the nearest online parking space for idle Shuttles, and can restart them at any time.

Embodiment 8, Implementation of Transport Mode for Passengers From Different Locations in City J to Different Locations in City K (that Is, all Weathers, Unistop, De-Consolidation Transport Passengers at different locations in City J get on the Shuttles nearby, and their respective Shuttles automatically choose the road conditions and the best road sections to combine into the optimal routes, and Unistop to reach their respective destinations (different locations in City K) directly without any stopping in the middle, and not to mention the need to first take a centralized high-speed rail or airplane in City J to City K and then transfer separately to reach their respective destinations. The detailed running process for each person is the same as in Embodiment 3, where everyone has different starting and ending points and different routes and different departure times, all of which eliminate the need for centralized inbound, timed departures, stopping en route and centralized outbound trips. This example best exemplifies the efficiency, convenience, and freedom of STS.

Embodiment 9, Implementation of Peak Traffic Capacity Enhancement

At a Metro transfer station, the average daily morning peak inbound volume in 2019 was 26,200, with 60,700 transfers. After the implementation of STS, all stations/stops have equal advantages, the number of inbound trips is significantly reduced, no transfers are required, and the number of transfers is reduced to 0 people.

Again, on a major urban roadway, the morning peak hour traffic volume is 19,630 pcu/hour and the evening peak hour traffic volume is 16,457 pcu/hour. After the implementation of STS, the hourly traffic flow is a minimum of 150,000 pcu/hour for a non-major section with 6 lanes in both directions. As can be seen, the regular capacity of the non-major sections of STS is 7.6-9.1 times the peak capacity of the major sections of 2TS. Note: Calculation basis—The pipe network is applied above urban conventional motor-vehicle lanes: six lanes (two-way), with magnetic-guide-ways each 1.8 m wide; shuttle length 2.4 m; ISS 1.6 m; speed 100 km/h. Per-lane flow≈100×1000/(2.4+1.6)=25000 pct/h; for six lanes, total≈2500×6=150000 pcu/h.

Embodiment 10, Shuttle Parameter Design and Effects

By removing components of conventional passenger vehicles, the shuttle's volume and weight are reduced. A set of preferred design parameters for the shuttle is approximately as follows (all parameters are not limited to this scheme):

1. Passenger shuttle: maximum curb weight 260 kg; external dimensions sized for comfortable seating and reduced aerodynamic drag, L×W×H≈2.4×0.9×1.4 m; smooth outer envelope with both transverse and longitudinal cross-sections being streamlined (e.g., spindle/teardrop/el-liptical, without limitation) to improve energy efficiency. Its aerodynamic performance is superior to that of passenger cars; therefore, its drag coefficient Cd lies between that of a water droplet and a sedan, i.e., 0.05-0.25, with 0.15 taken as a reference value.

By comparison, a "Toyota Crown 2024 2.5 L Supreme Edition" sedan (abbrev. "Toyota sedan," cited only as an example; comparison vehicles are not limited thereto) has: curb weight 2045 kg, L×W×H≈5.03×1.89×1.48 m, and Cd≈0.3.

Assuming equal load of two persons (160 kg) and equal speed, the shuttle shows substantial improvements in energy-efficiency-related indices over the Toyota sedan:

1.1 Owing to optimized exterior and dimensions, aero-dynamic-efficiency improvement by 4.4 times (Note:

Fdrag=0.5*ρ*Cd*A*v*v, where rho is the air density, Cd is the drag coefficient, A is the frontal area, and v is the speed. Drag reduction 77.5%).

1.2. With tires omitted, rolling-resistance energy consumption is zero.

1.3. Due to the above element changes and removal of many components, the fraction of effective energy (effective load ratio=load/(load+curb weight)) improves by 5.2 times.

1.4. With multiple shuttles operating head-to-tail (end-to-end coupling), from the second shuttle onward the aerodynamic drag of each shuttle decreases by 30%, yielding a cumulative reduction of $0.3(n-1)$, where n is the number of coupled shuttles.

1.5. The quasi-single-occupancy micro-sizing design reduces volume by 78%.

1.6. Removing most functional systems reduces weight by 87%.

1.7. The MLMD's pole piece size is $L \times W \approx 2 \times 0.25$ m, while the Toyota tire contact patch size is $L \times W \approx 0.25 \times 0.25$ m; thus, the shuttle's unit-area pressure on the roadway is only 4.8% of that of the Toyota sedan, enabling 90% reduction in roadway cost (Note: unit-area pressure=total weight/load-bearing area. Shuttle: $(260+160)/(2 \times 2 \times 0.25)$ $=420(260+160)/(2 \times 2 \times 0.25)=420$ kg/m^2; Toyota: $(2045+160)/(4 \times 0.25 \times 0.25)=8820$ kg/m^2).

2. Cargo shuttle: maximum curb weight 130 kg (excluding the miniature container). When the cargo shuttle carries a miniature container and goods, its external dimensions and gross weight are close to those of the passenger shuttle so as to meet multi-shuttle cooperative operation, energy-consumption constraints, and comparable running stability, and to facilitate standardization/generalization of components and efficient presetting, adjustment, and optimization of control parameters. Among these, the upper bounds of the shuttle's external dimensions and gross weight are used to ensure maglev stability under reduced-ISS operation, while the load upper bound is used to secure convergence of braking-distance and energy-consumption models.

INDUSTRIAL UTILITY

The invention herein has a strong industrial utility, which is demonstrated by the following aspects:

The invention herein solves the traffic problems that is currently a common face and urgent problems worldwide.

The technologies used in this invention are all current mature technologies and feasible technologies, with fewer components, simpler process, lower cost, resource saving.

The invention herein solves the dual-carbon problems and energy problems faced by mankind at the same time as it solves the problem of transportation vehicles and Traffic Systems.

The invention herein can be applied both locally (e.g., a peak section, a district, between two cities, etc.) and/or globally (e.g., a city, a country, etc.). From local to global application, it is only necessary to continuously assemble, extend and nest the standard Pipe Network System to cover a larger area, forming a larger regional STS, and finally realizing global access.

The larger the application of the invention, i.e., the more stops, the more pronounced its beneficial effects become. Suppose there are n stops, which have the same significance as the number of lines between two points, growing in a Permutation P (2, n) style.

The invention claimed is:

1. A transport shuttle, configured to operate within a fully-enclosed or semi-enclosed pipe network system of a shuttle transportation system (STS), and to execute, via an in-shuttle intelligent control system (IICS), control commands generated and issued by an intelligent control system (ICS) of the STS, thereby performing passenger or cargo transport in a non-autonomous mode, and completing transport in an unmanned, fully automatic manner under all-weather and continuous 24-hour conditions; comprising:

a shuttle body system, configured to form the main structure and the carrying space of the shuttle with a streamlined and lightweight layout;

a magnetic levitation and magnetic driving system (MLMD), configured as a drive unit of the shuttle;

an in-shuttle communication system (ISCS), configured to communicate bidirectionally between the shuttle and the ICS, and to interconnect with a communication system of the STS;

the IICS, configured as an on-board execution portion of the ICS;

an in-shuttle positioning system;

an in-shuttle sensing system;

an identification system;

a wiring harness system;

a backup drive system, comprising a backup instance of the MLMD, configured to provide short-term backup drive in maintenance or emergency conditions; and an in-shuttle safety system, an air conditioning system, a lighting system, a seating system, and an audio-visual interaction system, which are optional to transport modes or different task requirements;

wherein the shuttle is defined to include no systems such as engine or motor and starter, fuel supply and exhaust systems, or wheel-based mechanical transmission including wheel-drive, mechanical steering, braking, suspension, and gear-changing mechanisms; and is configured to perform levitation, guidance, and propulsion through electromagnetic or linear-motor components;

wherein the shuttle is configured to operate under an operation-control separation structure of the STS, via the IICS executing the control commands, so as to perform operating in a non-autonomous and unmanned manner throughout; and permits manual intervention;

wherein the IICS, configured to operate in a non-autonomous mode, to function as an execution end and to receive the operating parameters and control commands from the ICS to perform the control commands, switch operating states, prevent collision, and support the transport modes of the STS, thereby maintaining the shuttle in non-autonomous operation throughout;

the shuttle supports, under coordination by the ICS, the shuttle operating data exchange with other shuttles for cooperative control including cooperative yielding as well as following, synchronized arrival, inter-shuttle spacing (ISS) adjusting, or end-to-end coupling; and wherein the operating states comprise at least online driving, online parking, station docking, and channel yielding;

wherein the shuttle is configured to communicate bidirectionally with the ICS in real time via the ISCS; include at least: the shuttle operating data; the operating parameters; the control commands; and service information related to operation and passenger interaction information;

wherein the minimum ISS may be set to zero by the ICS to permit physical docking and to support multi-shuttle end-to-end coupling;

wherein the online parking is configured for an empty shuttle remaining online on standby during parking, and the empty shuttle need not be parked in designated offline parking spaces;

wherein, through interaction between the MLMD and a magnetic-guideway system (MGS) of the STS, the shuttle is configured to realize magnetic levitation, magnetic guidance, magnetic propulsion, and performs magnetic braking, so as to support execution of the control commands and switching of the operating states in real time, and is controlled by the ICS;

wherein the shuttle, in whole or in part, is configured as standardized, modular, replaceable, compatible, and interchangeable functional modules interconnected through unified mechanical, electrical, and communication interfaces;

wherein the in-shuttle positioning system is configured for positioning and ranging so as to support collision avoidance;

wherein the in-shuttle sensing system is configured to sense: the shuttle operating states; in-shuttle environmental data including temperature, humidity and air quality; and passenger status including vital signs;

wherein the in-shuttle safety system is configured to provide safety equipment, protective facilities, or a combination thereof, comprising sensing devices, alarm devices, airbags, seat belts, and fire extinguishers, and to provide monitoring anomalies, alarming or warnings, protection and emergency response for safety in the shuttle;

wherein the identification system, configured to identify passenger identity, to perform ride authorization and access control through processing by the ICS, and to perform an imperceptible settlement of ride fees by the STS;

wherein the shuttle operating data are measured by the in-shuttle positioning system, the in-shuttle sensing system and the in-shuttle safety system and feed back to the ICS and to the IICS for operational handling; and wherein the passenger interaction information, comprising service requests, emergency alerts, and health information, is transmitted to a human-machine interaction system (HMI) of the ICS via the audio-visual interaction system of the shuttle; and ride status is presented to the passenger;

wherein the shuttle comprises a passenger shuttle or a cargo shuttle;

wherein the passenger shuttle is configured for an optimized load of 1+1 persons, supporting seated or reclined for the main passenger, the rear seat being for an additional passenger and luggage storage, supporting exclusive ride, sharing, or caring for the elderly, the children, the sick, the disabled, and the pregnant; and wherein the cargo shuttle is configured to carry miniature containers with limited cargo loads, the miniature containers being replaceable as a whole for rapid loading and unloading.

2. The shuttle of claim 1, wherein the shuttle operating data comprise one or more selected from the operating states, position, speed, the ISS, passenger status, and in-shuttle environmental and in-shuttle safety data;

wherein the control commands comprise one or more selected from setting the direction of operation, issuing a preferred dynamic route (PDR), maintaining a safe distance, braking, driving, routing, adjusting an operating speed, setting an upper speed bound, adjusting the ISS, and setting or switching among the operating states; and wherein the service information comprises one or more selected from safety tips, station reminders, operational information, and destinations changed by passengers.

3. A shuttle transportation system (STS), specially adapted for a shuttle as the only transport unit within a pipe network system, operating in unistop mode in a non-autonomous manner to implement unmanned, all-weather, fully automatic passenger transport, cargo transport, or a combination thereof; the STS comprising:

a shuttleway system, comprising:
  a shuttle system, referred to as "the shuttle", comprising:
    a shuttle body system;
    a magnetic levitation and magnetic driving system (MLMD);
    an in-shuttle intelligent control system (IICS);
    an in-shuttle communication system (ISCS);
    an in-shuttle positioning system;
    an in-shuttle sensing system;
    an in-shuttle safety system; and
    an identification system;
  and the pipe network system;

a control-safeguard system, comprising:
  an intelligent control system (ICS); a communication system; an energy system; a service system; and a safety system;

an emergency response system; and a data system;

wherein the STS takes the shuttle as the only transport unit operating within the STS;

wherein the STS integrates, at a system level, the shuttleway system, the control-safeguard system, the data system and the emergency response system as constituent elements of the STS, the constituent elements being interconnected via IoT, and the ICS exercising unified control so as to support implementation of the transport modes, operation-control modes and monitor-safety modes of the STS;

wherein the ICS is configured to, based on the STS operating data monitored through the monitor-safety modes:
  generate and issue, in real time, the operating parameters and control commands to the relevant execution targets;
  perform network-wide scheduling, coordination, and system-level adaptive optimization; and
  form closed-loop control by comparing monitored feedback data with preset parameters;

wherein the ICS exercises unified system-level control over the STS;

wherein the ICS comprises subsystems respectively configured to handle system-level control, manual intervention, human-machine interaction, user-level temporary operations, and special priority control; and wherein the relevant execution targets comprise at least the shuttle and a magnetic-guideway system (MGS) of the pipe network system;

wherein the operation-control modes of the STS, configured such that:
  an operation-control separation structure is adopted between the ICS and an execution side comprising the shuttle and the MGS, and the two are interconnected via the communication system;

in the STS, the shuttle is configured to operate under an operation-control separation structure of the STS, via the IICS of the shuttle executing commands, so as to perform operating in a non-autonomous and unmanned manner throughout; and permits manual intervention;

without human intervention, the ICS performs adaptive optimization based on real-time data of the STS operating data system, trading off predicted time, resource utilization and system balance and dynamically updating the operating parameters;

a target speed profile is dynamically updated and constrained by an upper speed bound set by the ICS for each segment and operating condition; it provides continuous transitions across different guideway conditions, segments, regions, and operating phases, covering a wide and continuously adjustable operational speed range across different segments and conditions, and increases speed only up to the upper speed bound;

an inter-shuttle spacing (ISS) may be adjusted by the ICS, and the minimum ISS may be set to zero to permit physical docking and to support multi-shuttle end-to-end coupling;

a preferred dynamic route (PDR), issued by the ICS as a control command, executed by the IICS and distinct from a mere navigation suggestion, includes a standard route, a priority channel, a concession channel, and a non-fixed emergency corridor within the STS system;

the PDR is non-fixed, and dynamic routing to adapt to different task requirements and operating environments;

by the ICS, the PDR may be adjusted in real time based on the STS operating data and task demand to yield the shortest-time optimal route, and route-type switching is triggered for dispatching and controlling single-shuttle operation and multi-shuttle cooperative operation and for network-wide optimization;

upon a path obstacle or local segment closure, real-time updating of a path and rerouting to maintain continuity of operation; and capacity and parking space allocation, priority policies and route optimization are implemented, including utilizing free paths and clearing or dispatching other shuttles to yield an unobstructed path as the PDR, with rerouting when necessary to maintain network-wide optimization;

wherein the communication system is configured to interconnect the systems of the STS, and to transmit information between the ICS and constituent elements of the STS, based on IoT; and wherein, in the STS, the shuttle is configured to communicate bidirectionally with the ICS in real time via the ISCS; include at least: the shuttle operating data; the operating parameters; the control commands; and service information related to operation and passenger interaction information;

wherein the pipe network system is configured as a fully-enclosed or semi-enclosed structure that is deployable above existing infrastructures or in non-traffic spaces, to provide an operating space physically isolated from external traffic space in which the shuttle runs under the operating parameters and safety constraints, and is a fully interconnected grade-separated junction network, and to reserve interfaces for energy, communication, fire-fighting, and environmental control to support operation of the STS;

wherein the pipe network system includes no facilities or devices for manual driving, such as physical separation structures, traffic signaling devices, traffic signs, or surface markings; and wherein the ICS performs traffic direction and priority passage based on monitoring data via the communication system;

wherein, through interaction between the MLMD of the shuttle and the MGS of the pipe network system, the MGS is configured to realize magnetic levitation, magnetic guidance, magnetic propulsion, and performs magnetic braking, so as to support execution of the control commands and switching of the operating states in real time, and is controlled by the ICS;

wherein the priority policies comprise at least emergency-task priority or task priorities with different privilege levels, so as to ensure reasonableness of dispatch and system efficiency in situations of concurrent multiple tasks or resource conflicts;

wherein the priority channel, the concession channel, or the non-fixed emergency corridor are each route segments temporarily assigned by the ICS for priority passage and emergency passage within the network for high-priority tasks when needed, the route segments comprising one or more route segments selected from the group consisting of free paths, smooth-flowing sections, channel yielding;

the ICS dynamically assigns an online parking space according to magnetic-guideway occupancy and parking demand, and instructs an empty shuttle to perform online parking;

wherein the empty shuttle remains online on standby during parking and is instantly switchable to another one of the operating states; and wherein the online parking space is dynamically allocated and released immediately upon being vacated;

wherein "unistop" is defined as one or more direct modes selected from the group consisting of non-stop (NS), point-to-point (PP), and non-stop point-to-point (NSPP), selectable per task or segment;

wherein the STS is composed of standardized, modular units configured to be assembled, extended, and nested, and to be compatible and interchangeable, so as to support expansion and seamless connection of the pipe network system;

wherein the seamless connection links the pipe network system to a specific area including a medical area, an emergency area, or another public-service area;

wherein the transport modes comprise:

the shuttle performing transport tasks within the operating space of the pipe network system; and support for a passenger shuttle, a cargo shuttle, or a combination thereof as the transport unit;

under the control commands, the operating parameters and the upper speed bound, the shuttle performs in a non-autonomous, unmanned, and fully automatic manner under all-weather and continuous 24-hour operating conditions, with manual intervention permitted to provide unistop operation;

supporting single-shuttle operation and multi-shuttle cooperative operation, with following, synchronized arrival or end-to-end coupling;

automatic switching among the operating states for part or all of the shuttles; and the operating states comprise at least online driving, online parking, station docking, and channel yielding;

wherein the monitor-safety modes comprise:

the shuttle operating data, measured by the in-shuttle positioning system of the shuttle, a pipeline sensing system of the pipe network system, the in-shuttle sensing system of the shuttle, and the in-shuttle safety system of the shuttle, and are fed back to the ICS and the IICS for operational handling;

the pipeline sensing system, configured alone or in conjunction with the in-shuttle sensing system, to sense information including guideway conditions, shuttle conditions, shuttle speed, and shuttle position, and to provide the sensed information to the ICS;

the safety system, configured to perform safety cause monitoring, personal protection, and health monitoring trigger; comprising:

a cause monitoring system, configured to monitor the causes that may lead to accidents and operating anomalies in the STS, the monitoring data being processed by the ICS to generate disposal commands or released information comprising accident prediction, warning, elimination, avoidance, and emergency response;

a personal protection system, configured as a measure and response mechanism for protecting personal safety and set up in the pipe network system and the shuttle system, wherein the measure and response mechanism within the shuttle system is realized by the in-shuttle safety system; and a health monitoring trigger system, configured to trigger operation of a health-emergency response system to alter the travel destination, according to health data determined by the ICS or health information provided by the passenger via a human-machine interaction system (HMI);

wherein the STS is configured to perform ride authorization and access control through processing of passenger identity information transmitted from the identification system of the shuttle by the ICS, and to perform an imperceptible settlement of ride fees;

wherein the shuttleway system is configured as an integrated term for both a transport unit and a traffic infrastructure;

wherein the pipe network system is configured to constitute a physical pipe network and carry associated infrastructure; comprising:

a pipeline system configured to isolate a running channel of the shuttle from an external environment, and to provide space and protection for deployment of the MGS, an interchange system, a stop system, the pipeline sensing system, a cabling system, and an emergency egress corridor system;

the MGS as defined above, configured as the shuttle guideway and modularly assembled along the pipe network system;

the interchange system configured to form a fully interconnected structure at network intersections and to deploy the MGS;

the stop system configured to provide boarding, alighting, empty-shuttle handling, or a combination thereof; cargo loading, unloading, or a combination thereof; docking services; and deployment of the MGS;

the pipeline sensing system as defined above;

the cabling system, comprising energy, communication, and control lines, and configured to provide deployment and support for the same; and the emergency egress corridor system, which is physically separated from the driving passageway, configured to allow access of relevant personnel for emergency escape, inspection and maintenance, and accident handling;

wherein the control-safeguard system is configured as both operational control unit and safety protection unit for automatic operation of the STS;

wherein the communication system, comprises:

an intelligent control communication system configured to transmit the STS operating data; and an information communication system configured to be located at various points of the STS, to contain communication exchanges for civilian, police, and military communications, and not to involve control information;

wherein the energy system configured to supply energy and perform energy management for the STS; comprising:

a power distribution system configured to distribute electrical energy of the STS; and an energy saving system configured to recover and utilize energy generated during shuttle operation;

wherein the service system, comprising:

a stop service system configured to provide services for boarding, alighting, empty-shuttle handling, station guidance, and on-site services including temporary rest and timing of boarding and alighting;

an intercity service system configured as a service area and to provide related services supporting long-distance and cross-regional running needs;

an inspection-repair system configured to perform timed inspection, repair and fault troubleshooting for the entire STS system;

an operation-maintenance system configured to perform routine maintenance tasks and to ensure STS operational assurance;

a parking system configured to control online parking in close proximity at different times and to manage parking space allocation and docking of shuttles;

a cleaning system configured to perform environmental cleaning and hygiene assurance for the shuttle and the pipe network system; and a shuttle APP;

wherein the emergency response system is configured as an incident-response unit and to automatically initiate an emergency plan; comprising:

the health-emergency response system configured, upon detection of an abnormal passenger vital sign, to automatically trigger alarms, notify a hospital and a guardian, and execute a health-emergency rescue plan including rerouting or channel yielding an accident-emergency response system configured, upon occurrence of an operating accident, to trigger alarms and initiate an accident-emergency response plan including emergency stopping, escape, first aid, and retreating from accident points;

a fire-emergency response system configured, upon detection of a fire or suspected fire, to execute a fire-emergency response plan including automatic sprinkler or fire-extinguisher activation, emergency stopping, evacuation, rescue, and alarm control under fire conditions; and the emergency plan comprises one or more of: warnings that are audible, visual, or a combination thereof; route clearance, yielding, or a combination thereof; an emergency stop; opening a door; activating the nearest emergency corridor; automatic activation of fire suppression; a firefighting alarm; and routing to a hospital or redirecting to a safe path;

wherein the data system is configured as an operating-data collection, analysis and storage unit of the STS; comprising:

a data collection system configured to collect, in real time, all kinds of data, comprising the STS operating data and environmental data;

a data analysis system configured to analyze the acquired data intelligently and generate a basis for optimization decisions;

a data storage system configured to store the various data collected and analyzed; and wherein the STS is configured to include or support supporting facilities, modules or mechanisms for operation and maintenance, rescue or service, which are optionally provided and are not used as transport units.

4. The STS of claim 3, wherein the ICS comprises:

a central control system, configured as a control center of the STS, and configured to perform operation control and intelligent processing based on data aggregated through the communication system, and to generate the control commands so as to realize unmanned and unistop operations;

a manual control system configured to handle tasks that require manual control to be implemented so as to support human intervention, the tasks including at least installation and commissioning, inspection, repair, cleaning, and emergency, and being switchable with the central control system;

the HMI, configured to enable a human-machine dialog between the passenger and the ICS, allowing the ICS to determine whether the information is feasible and to issue commands to meet the passenger's reasonable needs, including switching endpoints, entering service areas, making calls, and processing passenger health information or medical needs, so as to change the travel destination or to activate the health-emergency response system;

a user control system configured to, under emergency conditions, handle temporary and limited operation signals issued by passengers, and, under priority strategies and safety conditions determined by the ICS, issue corresponding the control commands; and a special control system configured, under special situations including first aid, urgent public affairs, law enforcement, or military, to handle priority or concession requests, the requests being executed by the central control system according to priority strategies or, upon human intervention, by issuing corresponding the control commands.

5. The STS of claim 3, wherein the STS operating data comprise one or more selected from the shuttle operating data, the operating parameters, the control commands, the service information, monitoring data, magnetic-guideway occupancy, route status, guideway conditions, the STS status, the STS safety data, service information, and passenger interaction information;

wherein the shuttle operating data comprise one or more selected from the operating state, position, speed, the ISS, passenger status, and in-shuttle environmental and in-shuttle safety data;

wherein the operating parameters comprise one or more selected from segments of the PDR, the target speed profile, upper speed bounds, and the ISS;

wherein the control commands comprise one or more selected from setting the direction of operation, the PDR, maintaining a safe distance, braking, driving, routing, adjusting an operating speed, setting an upper speed bound, adjusting the ISS and, setting or switching the operating state; and wherein the service information comprises one or more selected from safety tips, station reminders, operational information, destinations changed by passengers.

6. The STS of claim 3, wherein the point-to-point operation transports a passenger from an origin to a destination without any transfers while permitting intermediate station stopovers for boarding or alighting other passengers, as scheduled by the ICS to consolidate riders with compatible destinations.

7. The STS of claim 3, wherein the imperceptible settlement is configured for ticket-free, automatic, and user-unaware settlement of ride fees.

8. The STS of claim 3, wherein the PDR is generated by using currently unobstructed segments, by means of channel yielding, or by a combination thereof.

* * * * *